United States Patent
Kato et al.

(10) Patent No.: US 7,908,416 B2
(45) Date of Patent: Mar. 15, 2011

(54) DATA PROCESSING UNIT AND BUS ARBITRATION UNIT

(75) Inventors: Shuhei Kato, Shiga (JP); Koichi Sano, Shiga (JP); Koichi Usami, Shiga (JP)

(73) Assignee: SSD Company Limited, Kusatsu-Shi, Shiga (JP)

( * ) Notice: Subject to any disclaimer, the term of this patent is extended or adjusted under 35 U.S.C. 154(b) by 469 days.

(21) Appl. No.: 11/569,753

(22) PCT Filed: May 27, 2005

(86) PCT No.: PCT/JP2005/010209
§ 371 (c)(1),
(2), (4) Date: Feb. 3, 2009

(87) PCT Pub. No.: WO2005/119465
PCT Pub. Date: Dec. 15, 2005

(65) Prior Publication Data
US 2009/0157934 A1 Jun. 18, 2009

(30) Foreign Application Priority Data
Jun. 1, 2004 (JP) .................................. 2004-162974

(51) Int. Cl.
*G06F 13/36* (2006.01)
*G06F 12/00* (2006.01)
*G06F 13/00* (2006.01)

(52) U.S. Cl. .......... 710/113; 710/36; 710/110; 710/114; 710/241; 710/244; 709/209; 700/3

(58) Field of Classification Search .................. 710/36, 710/113, 114, 241, 244
See application file for complete search history.

(56) References Cited

U.S. PATENT DOCUMENTS

| 5,195,089 A | * | 3/1993 | Sindhu et al. ................. 370/235 |
| 5,619,647 A | * | 4/1997 | Jardine ......................... 709/240 |
| 6,070,205 A | * | 5/2000 | Kato et al. .................... 710/100 |

(Continued)

FOREIGN PATENT DOCUMENTS

JP     5-189311 A    7/1993

(Continued)

OTHER PUBLICATIONS

International Search Report, Aug. 26, 2005, from International Phase of the instant application.

*Primary Examiner* — Brian T Misiura
(74) *Attorney, Agent, or Firm* — Jackson Patent Law Office

(57) ABSTRACT

An effective bus arbitration unit is described in which it is possible to reduce, as much as possible, the waiting time until a bus master obtain bus ownership and improve the rate of operating the bus while improving the throughput of data transfer. A bus master issues a size signal (for example, signal "CDSZ") indicative of the size of data to be read or written. A state machine 155 grants bus ownership to the bus master for the bus cycles corresponding to the size signal in order to enable the bus master to successively read or write data. Arbitration is performed once for every series of bus cycles corresponding to the size requested by the bus master. Since the size signal is issued by the bus master as a size signal indicative of the necessary and sufficient size for data transmission, the state machine 155 can set an optimal number of bus cycles.

42 Claims, 8 Drawing Sheets

U.S. PATENT DOCUMENTS

| | | | |
|---|---|---|---|
| 6,393,505 B1 * | 5/2002 | Scalise et al. | 710/107 |
| 6,457,106 B1 * | 9/2002 | Watanabe | 711/147 |
| 6,748,505 B1 * | 6/2004 | Dakhil | 711/167 |
| 6,810,455 B2 * | 10/2004 | Wyland | 710/113 |
| 6,820,152 B2 * | 11/2004 | Kanzaki et al. | 710/244 |
| 2002/0161956 A1 * | 10/2002 | Kanzaki et al. | 710/240 |

FOREIGN PATENT DOCUMENTS

| | | |
|---|---|---|
| JP | 5-307519 A | 11/1993 |
| JP | 7-225744 A | 8/1995 |
| JP | 8-30549 A | 2/1996 |
| JP | 10-228446 A | 8/1998 |
| JP | 2001-154977 A | 6/2001 |

* cited by examiner

| Priority Level Information Number | First Priority Level | Second Priority Level | Third Priority Level | Fourth Priority Level | Fifth Priority Level | Sixth Priority Level | Seventh Priority Level | Eighth Priority Level | Ninth Priority Level | Tenth Priority Level | Eleventh Priority Level | Twelfth Priority Level |
|---|---|---|---|---|---|---|---|---|---|---|---|---|
| 0 | SP/WAV | SP/ENV | GP/BMP | GP/CHR | GP/HDR | GP/SPR | GP/TX1 | GP/TX2 | PLT/PLT | DMA/DMAD | CPU/DAT | CPU/IST |
| 1 | GP/BMP | GP/CHR | GP/HDR | GP/SPR | GP/TX1 | GP/TX2 | PLT/PLT | SP/WAV | SP/ENV | DMA/DMAD | CPU/DAT | CPU/IST |
| 2 | DMA/DMA | SP/WAV | SP/ENV | GP/BMP | GP/CHR | GP/HDR | GP/SPR | GP/TX1 | GP/TX2 | PLT/PLT | CPU/DAT | CPU/IST |
| 3 | CPU/DAT | CPU/IST | SP/WAV | SP/ENV | GP/BMP | GP/CHR | GP/HDR | GP/SPR | GP/TX1 | GP/TX2 | PLT/PLT | DMA/DMAD |

| Abbreviations of Bus Masters | |
|---|---|
| CPU: | CPU |
| GP: | Graphics Processor |
| SP: | Sound Processor |
| DMA: | DMA Controller |
| PLT: | Pixel Plotter |

| Abbreviations of First Bus Use Request Purposes | |
|---|---|
| IST: | Instruction Fetch |
| DAT: | Data Access |
| TX1: | First Background Array Data |
| TX2: | Second Background Array Data |
| SPR: | Sprite DMA |
| HDR: | Character Header |
| CHR: | Character Data |
| BMP: | Bitmap Data |
| WAV: | Wave Data |
| ENV: | Envelope Data |
| DMAD: | DMA Destination |
| PLT: | Pixel Plotter |

Fig. 2

| Priority Level Information Number | First Priority Level | Second Priority Level | Third Priority Level | Fourth Priority Level | Fifth Priority Level | Sixth Priority Level | Seventh Priority Level | Eighth Priority Level | Ninth Priority Level |
|---|---|---|---|---|---|---|---|---|---|
| 0 | SP/WAV | SP/ENV | GP/BMP | GP/CHR | GP/HDR | PLT/PLT | DMA/DMAS | CPU/DAT | CPU/IST |
| 1 | GP/BMP | GP/CHR | GP/HDR | SP/WAV | SP/ENV | PLT/PLT | DMA/DMAS | CPU/DAT | CPU/IST |
| 2 | PLT/PLT | DMA/DMA | SP/WAV | SP/ENV | GP/BMP | GP/CHR | GP/HDR | CPU/DAT | CPU/IST |
| 3 | CPU/DAT | CPU/IST | SP/WAV | SP/ENV | GP/BMP | GP/CHR | GP/HDR | PLT/PLT | DMA/DMAS |

Abbreviations of Bus Masters

- CPU: CPU
- GP: Graphics Processor
- SP: Sound Processor
- DMA: DMA Controller
- PLT: Pixel Plotter

Abbreviations of Second Bus Use Request Purposes

- IST: Instruction Fetch
- DAT: Data Access
- HDR: Character Header
- CHR: Character Data
- BMP: Bitmap Data
- WAV: Wave Data
- ENV: Envelope Data
- DMAS: DMA Source
- PLT: Pixel Plotter

Fig. 3

| Second Bus Use Request Purpose | Requested Size (Bytes) |
|---|---|
| Instruction Fetch | 1 ~ 4 |
| Data Access | 1 |
| Character Header | 0 |
| Character Data | 1 ~ 16 |
| Bitmap Data | 8 |
| Pixel Plotter | 1 ~ 2 |
| Wave Data | 1 |
| Envelope Data | 1 |
| DMA Source | 1 ~ 4 |

Fig. 5

DATA PROCESSING UNIT AND BUS ARBITRATION UNIT

TECHNICAL FIELD

The present invention relates to a data processing unit capable of arbitrating bus ownership and the related techniques.

BACKGROUND ART

Japanese Patent Published Application No. Hei 08-30549 discloses a conventional bus controller which performs bus arbitration among a plurality of bus masters M1 to M7 connected to a shared bus. When the bus masters M1 to M6 other than the bus master M7 having the highest priority output bus use requests, the bus arbitration circuit of this bus controller grants the ownership of the shared bus to a bus master which has the highest priority among the bus masters requesting the use of the shared bus. Also, when the bus master M7 having the highest priority outputs a bus use request while any one of the bus masters M1 to M6 is using the shared bus, a bus usage interruption judgment circuit judges whether or not the remaining bus cycle time, through which the bus master is to continue using the bus, exceeds a predetermined period. If the remaining bus cycle time does not exceed the predetermined period, the bus usage interruption judgment circuit permits the continued use of the bus as it is (in order not to deteriorate the overall system performance), and conversely if the remaining bus cycle time exceeds the predetermined period, the bus usage interruption judgment circuit interrupts the use of the bus by the bus master and grants the ownership of the bus to the bus master M7 having the highest priority (preferentially proceeding with the process of the bus master M7 having the highest priority).

Next, in an exemplary case where bus ownership is granted to the bus master M2, the operation of the bus master M2 will be explained in detail after bus ownership is granted. The bus master M2 outputs a memory address together with the number of the bus cycles required for data transmission and then starts the data transmission. On the other hand, the bus usage interruption judgment circuit detects the information of the number of the bus cycles as output from the bus master M2, and sets a cycle counter to the number. Then, the cycle counter counts down by one every time when the data transmission proceeds corresponding to one bus cycle.

By this process, if the bus master M7 having the highest priority outputs a bus use request to the bus usage interruption judgment circuit while the bus master M2 is transferring data, the bus usage interruption judgment circuit compares the value of the cycle counter to a maximum acceptable count. As a result, if the value of the cycle counter is less than the maximum acceptable count, the bus master M2 is permitted to continue the data transfer without taking any particular step.

However, if the value of the cycle counter equals or exceeds the maximum acceptable count, the bus usage interruption judgment circuit halts the bus master M2 transferring data, outputs a hold signal to the bus arbitration circuit and then grants bus ownership to the bus master M7 having the highest priority.

After receiving the hold signal from the bus usage interruption judgment circuit, the bus arbitration circuit does not perform bus arbitration anew while maintaining the state taken just before the hold signal is output from the bus usage interruption judgment circuit and, when the hold signal is removed, bus ownership is granted again to the bus master M2.

By this means, it is realized to maintain the overall system performance and preferentially proceed with the process of the bus master M7 having the highest priority.

However, once bus ownership is granted, the bus masters M1 to M6 can occupy the shared bus for the bus cycles as required unless the bus master M7 having the highest priority outputs a bus use request. Also, even if the bus master M7 having the highest priority outputs a bus use request during data transfer, the bus masters M1 to M6 can occupy the shared bus for the bus cycles as required in total only with a temporary halt. In the same manner, the bus master M7 having the highest priority and granted bus ownership can occupy the shared bus for the bus cycles as required. The number of clocks per bus cycle is fixed throughout the memory space in this case. Because of this, in the case where the common bus is connected to a plurality of different types of memory devices having different access speeds, superfluous clocks are inevitable in part of bus cycles.

Accordingly, there is a problem that the bus masters M1 to M6 other than the bus master M7 having the highest priority tend to wait for a substantial time so that the processing performance as viewed from the overall system tends to decrease. Particularly, this problem becomes significant when the throughput of data transfer is improved by the use of a fast access mode such as a page mode. In other words, because such a fast access mode is performed by successively transferring a certain amount of data to increase the throughput of the data transfer, the waiting time of the bus masters M1 to M6 tends to increase by this fast access mode.

DISCLOSURE OF INVENTION

It is therefore an object of the present invention to provide a data processing unit and the related techniques in which it is possible to reduce, as much as possible, the waiting time until the respective bus masters obtain bus ownership and improve the rate of operating the bus while improving the throughput of data transfer. In accordance with the first aspect of the present invention, a data processing unit comprises: a bus; a plurality of bus masters connected to said bus; and a bus arbitration unit operable to perform arbitration of a plurality of bus use requests issued from said plurality of bus masters and grant bus ownership to one of said bus masters, wherein when issuing the bus use request to said bus arbitration unit, said bus master also issues size information indicative of the size of data to be read or written, and wherein said bus arbitration unit comprising: a priority control unit operable to select one of said bus masters from among a single or a plurality of said bus masters issuing the bus use requests on the basis of priority ranking information, provided for determining the priority levels of said plurality of bus masters; and a bus access control unit operable to grant bus ownership to said one of the bus masters as selected by said priority control unit for using said bus for one or more bus cycles corresponding to the size information as issued by said one of the bus masters as selected by said priority control unit, wherein said priority control unit is configured to make the selection of said one of the bus masters once for each series of the one or more bus cycles corresponding to the size information.

By this configuration, since the bus cycles corresponding to the size requested by the bus master can be granted to the bus master, the bus master can successively read or write data. Since the respective bus masters are permitted to successively use the bus in this manner and, at the same time, arbitration is always performed once for every series of the bus cycles corresponding to the requested size, it is possible to increase the rate of operating the bus and decrease the latency responsive to the bus use request from the bus master as short as possible.

In addition to this, since the size of data to be read or written is issued by the bus master as the size information indicative of the necessary and sufficient size for data transmission, the bus access control circuit can set an optimal number of bus cycles. Accordingly, in this case, it is possible to further improve the rate of operating the bus and further shorten the latency of the response to the bus use request.

In the data processing unit as described above, the size information is indicative of the number "S" of bytes to be read or written, wherein when issuing the bus use request to said priority control unit, said bus master also issues address information "P" indicative of a byte address pointing to the first byte of the bytes to be read or written, and wherein said bus access control unit grants bus ownership to said one of the bus masters as selected by said priority control unit for "N" bus cycles which can be calculated by an equation (3), $$N=((P+S-1)/W)-(P/W)+1 \quad (3)$$

where "W" is the number of bytes corresponding to the data bus width 20, of the area pointed to by the address information "P", and "/" stands for a dividing operator for obtaining an integer quotient after discarding a fractional residue.

By this configuration, even in the case where the bus master designates the size of data to be read or written in terms of the number of bytes, the bus access control unit can grant to the bus master the bus ownership of the necessary and sufficient bus cycles corresponding to the data bus width, and therefore it is possible to improve the rate of operating the bus and shorten the latency of the response to the bus use request.

The equation (3) will be explained. The address information "P" indicates the number of the byte from which the data read or write operation starts, as counted from the zeroth byte. Thus, the number (P+S−1) indicates the number of the byte, at which the data read or write operation ends, as counted from the zeroth byte.

Since the number "W" of bytes of the data bus width of the area designated by the address information "P" indicates the number of bytes of one word of the memory to be connected, the number (P+S−1)/W indicates the ordinal number of the word, at which the data read or write operation ends, as counted from the zeroth word, and the number (P/W) indicates the ordinal number of the word, from which the data read or write operation starts, as counted from the zeroth word. In other words, the number "N" indicates the number of words to be read or written. Accordingly, as easily understood, if it is assumed that one word data is transferred in one bus cycle, the number "N" indicates the number of bus cycles required for transferring data.

In the data processing unit as described above, an address space of said bus is divided into a plurality of areas, wherein the number "W" of bytes of the data bus width can be set independently for each of the areas, and wherein said bus access control unit judges which of the plurality of areas is designated by the address information "P" issued by said bus master as selected by said priority control unit, and calculates the "N" on the basis of the equation (3) by the use of the number "W" of bytes of the data bus width which is set of the area pointed to by the address information "P".

By this configuration, even in the case where the address space is divided into the plurality of areas having different data bus width, the bus access control unit can grant to each bus master the bus ownership of the necessary and sufficient bus cycles corresponding to the data bus width of the area to be accessed, and therefore it is possible to improve the rate of operating the bus and shorten the latency of the response to the bus use request.

In the data processing unit as described above, when a predetermined bus master (hereinafter referred to as an interrupt bus master) of said plurality of bus masters issues the bus use request while said bus master other than said interrupt bus master is using said bus, said bus access control unit interrupts the use of said bus by said bus master using said bus and grants bus ownership to said interrupt bus master on the condition that the number of the remaining bus cycles currently granted to said bus master using said bus is not smaller than a predetermined number.

By this configuration, it is possible to preferentially proceed with the urgent process of the bus master without delay while maintaining the advantages of successive bus cycles given to the respective bus masters. The details are as follows. While the general throughput of data transmitted by the bus can be increased by granting bus ownership to the respective bus masters for successive bus cycles, the latency from issuing the bus use request by the bus master to obtaining bus ownership tends to increase. However, in the case where there is the bus master which is responsible for processing such an urgent task that bus ownership must be granted within a predetermined time period after issuing the bus use request, the increase of the latency may cause a trouble in the operation of the system. In this situation, while not compromising the throughput, it is possible to avoid the disadvantages associated with the increased latency by accepting the interrupt for granting bus ownership to the bus master responsible for processing an urgent task if the bus master responsible for processing the urgent task issues the bus use request and if the number of the remaining bus cycles granted to the current bus master using the bus is not smaller than the predetermined number.

In the data processing unit as described above, said bus masters issue the bus use requests to said priority control unit respectively for a plurality of bus use request purposes, the number of the bus use request purposes being larger than the number of said bus masters, wherein the priority ranking information is used to determine the priority levels of the bus use request purposes of said bus masters, wherein said priority control unit selects one bus use request purpose on the basis of the priority ranking information from among the bus use request purposes in association with which one or more bus masters of said bus masters are issuing bus use requests, and wherein said bus access control unit grants bus ownership to said bus master having the bus use request purpose selected by said priority control unit for one or more bus cycles corresponding to the size information issued by said bus master having the selected bus use request purpose.

By this configuration, there are the following advantages. Namely, in the case where the bus masters have the plurality of bus use request purposes, if the bus arbitration unit performs arbitration only of the respective bus masters, an additional circuit must be provided in the respective bus masters for performing arbitration of the bus use requests, resulting in a greater hardware size. In addition, depending upon the circuit configuration, a time overhead may occur from the arbitration of the bus use request purposes in the respective bus masters. However, in the case where the bus arbitration unit performs arbitration of the respective bus use request purposes, the above disadvantages shall not occur.

In the data processing unit as described above, said bus masters issue the size information indicative of different sizes for different bus use request purposes.

By this configuration, since the size information indicative of the different size can be issued for each bus use request purpose corresponding to its necessary data size, it is possible to reduce the number of ineffective data accesses, further improve the rate of operating the bus and further shorten the latency of the response to the bus use request.

In the data processing unit as described above, multiple sets of priority level information are prepared as the priority ranking information, wherein said priority control unit sequentially and cyclically selects one of the multiple sets of the priority level information for every arbitration of the bus use requests from said bus masters for granting bus ownership, and selects said bus master to which bus ownership is granted on the basis of the set of the priority level information as selected.

By this configuration, the distribution of bus cycles among the respective bus masters can be controlled by sequentially and cyclically selecting one of the multiple sets of priority level information.

In the data processing unit as described above, said bus access control unit includes a bus cycle period information storing unit for storing bus cycle period information indicative of the length of one bus cycle, and wherein a bus cycle period is controlled on the basis of the bus cycle period information stored in said bus cycle period information storing unit.

By this configuration, since the length of one bus cycle can be set by loading appropriate values to the bus cycle period information storing unit through the bus master (for example, CPU), it is possible to optimize the length of one bus cycle corresponding to the speed of the memory.

In the data processing unit as described above, the bus cycle period information is fixedly provided in hardware or dynamically set by said bus master.

By this configuration, since the bus cycle period can be set by the bus master such as a CPU, it is possible to optimize the length of one bus cycle corresponding to the speed of the memory connected to the bus, without need for modification of hardware. In addition, it is expected to reduce the power consumption by dynamically changing the bus cycle period in accordance with the current operation mode.

In the data processing unit as described above, an address space of said bus is divided into a plurality of data blocks, wherein the bus cycle period information includes first bus cycle period information and second bus cycle period information, and wherein said bus access control unit is configured when the number of bus cycles granted to said bus master is "1", to select the first bus cycle period information when the number of bus cycles granted to said bus master is "2" or more, to select in the first bus cycle the first bus cycle period information and select in the subsequent bus cycles the second bus cycle period information if the address information points to the same data block as the address information in the previous bus cycle and the first bus cycle period information if the address information points to the data block different from the data block pointed to by the address information in the previous bus cycle.

By this configuration, in the case where the bus is connected to the memory which is accessible in a high speed access mode such as a page access mode, it is possible to optimize the bus cycle period for the respective bus cycles, and therefore further improve the rate of operating the bus and further shorten the latency of the response to the bus use request.

In the data processing unit as described above, the size of the data block is fixedly provided in hardware or dynamically set by said bus master.

By this configuration, since the size of data blocks can be set by the bus master such as a CPU, it is possible to optimize the size of data blocks in accordance with the page size of the memory as connected, without need for modification of hardware.

In the data processing unit as described above, the first bus cycle period information and the second bus cycle period information are fixedly provided in hardware or dynamically set by said bus master.

By this configuration, since the first bus cycle period and the second bus cycle period can be set by the bus master such as a CPU, it is possible to optimize each bus cycle period corresponding to the random access speed and the page mode access speed in the page mode of the memory connected to the bus, without need for modification of hardware.

In the data processing unit as described above, said bus access control unit includes a bus cycle period information storing unit for storing bus cycle period information indicative of the length of one bus cycle, and wherein a bus cycle period is controlled on the basis of the bus cycle period information stored in said bus cycle period information storing unit, an address space of said bus is divided into a plurality of data blocks, wherein the bus cycle period information includes first bus cycle period information and second bus cycle period information, and wherein said bus access control unit is configured when the number of bus cycles granted to said bus master is "1", to select the first bus cycle period information when the number of bus cycles granted to said bus master is "2" or more, to select in the first bus cycle the first bus cycle period information and select in the subsequent bus cycles the second bus cycle period information if the address information points to the same data block as the address information in the previous bus cycle and the first bus cycle period information if the address information points to the data block different from the data block pointed to by the address information in the previous bus cycle, the address space of said bus is divided into a plurality of areas, and the number "W" of bytes of the data bus width, the first bus cycle period information, the second bus cycle period information and the size of the data block can be set for each of the areas, wherein said bus access control unit judges which of the plurality of areas is designated by the address information "P" issued by said bus master as selected by said priority control unit, and calculates the "N" on the basis of the equation (3) by the use of the number "W" of bytes of the data bus width which corresponds to the area pointed to by the address information "P".

By this configuration, in the case where the address space of the memory is divided into the plurality of areas having different random access speeds, different page access speeds and different data bus widths, the bus arbitration unit switches the first bus cycle period, the second bus cycle period and the data bus width each time arbitration is performed in accordance with the settings of the area to be accessed in order to optimize the bus cycle period and the number of the bus cycles granted to the bus master.

In accordance with the second aspect of the present invention, a bus arbitration unit operable to perform arbitration of a plurality of bus use requests issued from a plurality of bus masters and grant bus ownership to one of the bus masters, comprises: a priority control unit operable to select one of the bus masters from among a single or a plurality of the bus masters issuing the bus use requests on the basis of priority ranking information provided for determining the priority levels of the plurality of bus masters; and a bus access control unit operable to grant bus ownership to the one of the bus masters as selected by said priority control unit for using the bus for one or more bus cycles corresponding to size information which is issued by the one of the bus masters as selected by said priority control unit, wherein said priority control unit is configured to make the selection of the one of the bus masters once for each series of the one or more bus cycles corresponding to the size information, and wherein the size information is information indicative of the size of data to be read or written by the bus master.

Accordingly, by this configuration, there are the same advantages as in the data processing unit of the first aspect of the present invention.

In accordance with the third aspect of the present invention, a data processing unit comprises: an address bus through which an address space can be accessed; a data bus operable to transport data by designating an address of the address space; a plurality of bus masters connected to said address bus and said data bus; a bus arbitration unit operable to perform arbitration of a plurality of bus use requests issued from said plurality of bus masters and grant bus ownership to one of said bus masters; and a clock signal generation unit operable to supply a clock signal to said plurality of bus masters and said bus arbitration unit, wherein said bus arbitration unit sets different numbers of clock cycles of the clock signal respectively for a plurality of areas in the address space such that one bus cycle required for transferring data by designating an address of the address space consists of the number of clock cycles corresponding to the area including the address as designated, wherein when issuing a bus use request, said bus master outputs to said bus arbitration unit a signal indicative of the address and size of data to be transferred, and wherein said bus arbitration unit calculates the number of clock cycles on the basis of the address and size of data as output from said bus master, and grants bus ownership to said bus master for the number of clock as calculated.

Accordingly, by this configuration, there are the same advantages as in the data processing unit of the first aspect of the present invention.

In accordance with the fourth aspect of the present invention, a data processing unit comprises: an address bus through which an address space can be accessed; a data bus operable to transfer data by designating an address of the address space; a plurality of memory devices having different access speeds and connected to said address bus and said data bus; a plurality of bus masters connected to said address bus and said data bus; a bus arbitration unit operable to perform arbitration of a plurality of bus use requests issued from said plurality of bus masters and grant bus ownership to one of said bus masters; and a clock signal generation unit operable to supply a clock signal to said plurality of bus masters and said bus arbitration unit, wherein when issuing the bus use request for accessing one of said memory devices, said bus master outputs to said bus arbitration unit a signal indicative of the size of data to be transferred, and wherein when bus ownership is granted to said bus master for accessing one of said memory devices, said bus arbitration unit calculates the number of clock cycles as required for accessing said one of said memory devices on the basis of the access speed of said one of said memory devices and the size of data as output from said bus master, and grants the bus ownership to said bus master for the number of clock cycles as calculated.

Accordingly, by this configuration, there are the same advantages as in the data processing unit of the first aspect of the present invention.

BRIEF DESCRIPTION OF DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 2 is a view showing an example of a priority level table containing a plurality of priority level information sets for use in the first bus arbiter in accordance with the embodiment of the present invention shown in FIG. 1.

FIG. 3 is a view showing an example of a priority level table containing a plurality of priority level information sets for use in the second bus arbiter in accordance with the embodiment of the present invention shown in FIG. 1.

FIG. 5 is a view showing exemplary sizes of data as requested for the respective second bus use request purposes in accordance with the embodiment of the present invention shown in FIG. 1.

BEST MODE FOR CARRYING OUT THE INVENTION

In what follows, several embodiments of the present invention will be explained in conjunction with the accompanying drawings. Meanwhile, like references indicate the same or functionally similar elements throughout the respective drawings, and therefore redundant explanation is not repeated. Also, when it is necessary to specify a particular bit or bits of a signal in the description or the drawings, [a] or [a:b] is suffixed to the name of the signal. While [a] stands for the a-th bit of the signal, [a:b] stands for the a-th to b-th bits of the signal. In regard to the hexadecimal expression, "H" is suffixed to the number in order to distinguish it from the decimal expression. Also, while a prefixed "0b" is used to designate a binary number, a prefixed "0x" is used to designate a hexadecimal number. A single bit signal takes a "1" as an assertion (truth) and a "0" as a negation (false) unless otherwise specified.

Figure 1:
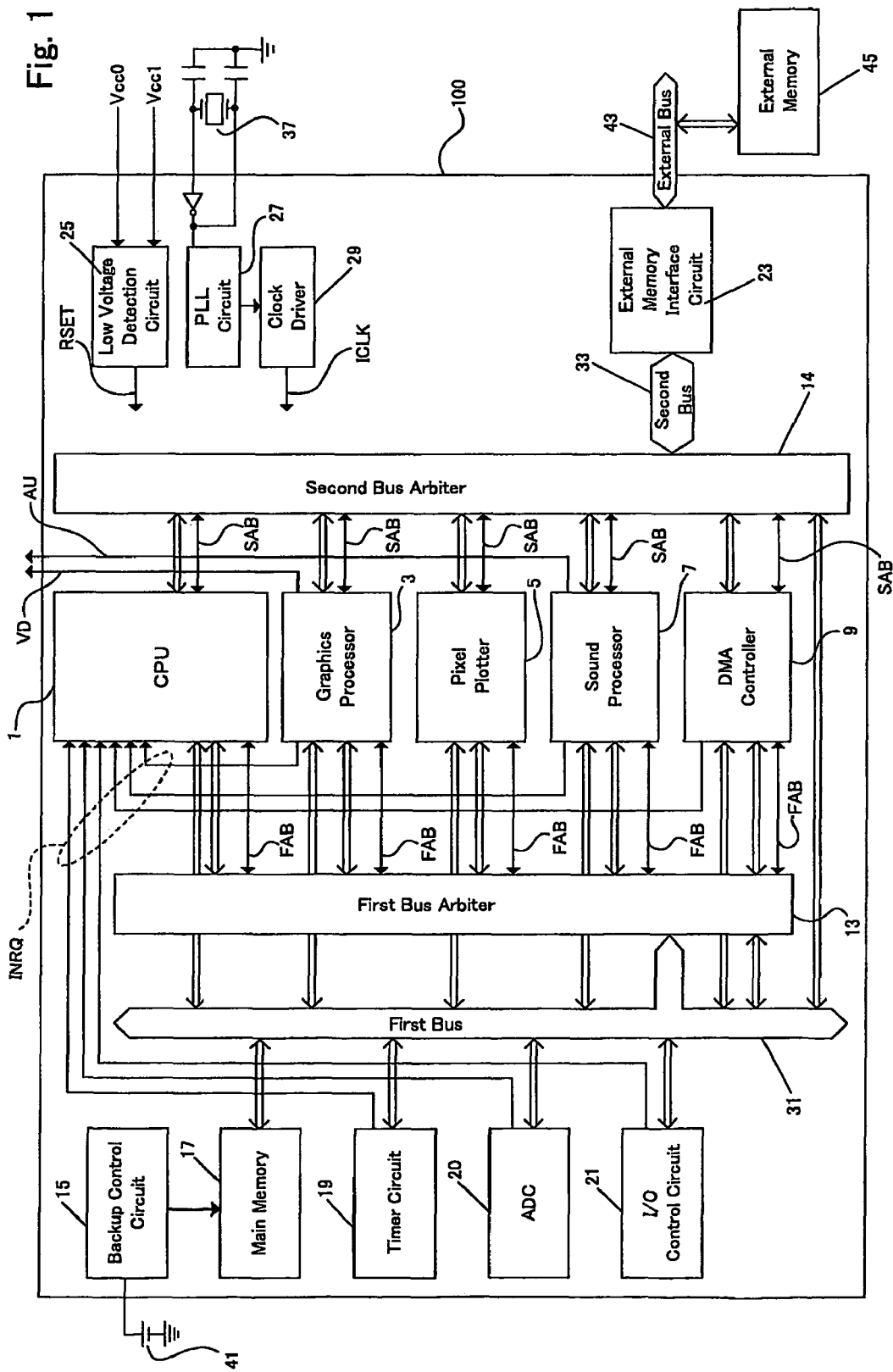
FIG. 1 is a block diagram showing the overall configuration of a processor as a data processing unit in accordance with an embodiment of the present invention.

FIG. 1 is a block diagram showing the overall configuration of the processor 100 as a data processing unit in accordance with an embodiment of the present invention. As shown in FIG. 1, this processor 100 includes a central processing unit (CPU) 1, a graphics processor 3, a pixel plotter 5, a sound processor 7, a DMA (direct memory access) controller 9, a first bus arbiter 13, a second bus arbiter 14, a backup control circuit 15, a main memory 17, a timer circuit 19, an analog-to-digital converter (ADC) 20, an input/output control circuit 21, an external memory interface circuit 23, a clock driver 29, a PLL (phase-locked loop) circuit 27, a low voltage detection circuit 25, a first bus 31 and a second bus 33. In the present embodiment, the main memory 17 and the external memory 45 are generally referred to as the "memory MEM" in the case where they need not be distinguished.

The CPU 1 performs various operations and controls the overall system in accordance with a program stored in the memory MEM. The CPU 1 is a bus master of the first bus 31 and the second bus 33, and can access the resources connected to the respective buses.

The graphics processor 3 is a bus master of the first bus 31 and the second bus 33, and serves to convert the data stored in the memory MEM into graphic data, and generate a video signal VD to be output to a television receiver (not shown in the figure) on the basis of the graphic data. In this case, the graphic data is generated by combining background screen, sprite and bitmap screen. The background screen which covers entirety of the screen of a television receiver comprises a two-dimensional array. And each array element consists of rectangular sets of pixels. There is prepared a first background screen and a second background screen respectively as the background screen. A sprite consists of a rectangular set of picture elements which can be relocated in any position of the screen of the television receiver. The rectangular set of picture elements constituting each of the background screens or sprites is referred to as a character. The bitmap screen consists of a two dimensional pixel array of which the size and location as displayed can be freely designated.

Also, the graphics processor 3 is controlled by the CPU 1 through the first bus 31, and capable of issuing an interrupt request signal "INRQ" to the CPU 1.

The pixel plotter 5 is controlled by the CPU 1 through the first bus 31, and capable of drawing pixel data as given from the CPU 1. In this example, the drawing operation can be performed with individual pixels. Pixel data is data representing the display color of one pixel by M bits (M is one or a larger integer corresponding to a color mode of M bits/pixel). In the present embodiment, M=1 to 8 as an example. Meanwhile, in the present embodiment, an indirect color representation method is employed by the use of a color palette for designating actual colors to be displayed.

Also, the pixel plotter 5 makes it possible to perform high-speed drawing and effectively use the buses (the first bus 31 and the second bus 33) by virtue of a cache system. Furthermore, the pixel plotter 5 is a bus master of the first bus 31 and the second bus 33, and capable of autonomously writing data from a cache (not shown in the figure) to the memory MEM and from the memory MEM to the cache.

The sound processor 7 is a bus master of the first bus 31 and the second bus 33, and serves to convert data stored in the memory MEM into sound data, and generate and output an audio signal AU on the basis of the sound data.

The sound data is synthesized by pitch conversion and amplitude modulation of PCM (pulse code modulation) data serving as the starting base data of tone quality. For the amplitude modulation, an envelope control function for reproducing waveforms of a music instrument is provided in addition to a volume control function performed in response to an instruction of the CPU 1.

Furthermore, the sound processor 7 is controlled by the CPU 1 through the first bus 31, and capable of issuing an interrupt request signal "INRQ" to the CPU 1.

The DMA controller 9 controls data transfer from the external memory 45 connected to an external bus 43 to the main memory 17. The external memory 45 may be implemented with, for example, an SRAM (static random access memory), a DRAM (dynamic random access memory), a ROM (read only memory) or any other appropriate memory, or implemented with a combination of any number of such memories. However, in the present embodiment, the external memory 45 are composed of a plurality of memory devices having different access speeds, such as a mask ROM, a flash memory and so forth. On the other hand, the DMA controller 9 has the function of outputting, to the CPU 1, an interrupt request signal "INRQ" indicative of the completion of the data transfer. Particularly, the DMA controller 9 is a bus master of the first bus 31 and the second bus 33, and controlled by the CPU 1 through the first bus 31.

The main memory 17 may be implemented with one or any necessary combination of a mask ROM, an SRAM and a DRAM in accordance with the system requirements. In the present embodiment, the main memory 17 is composed of an SRAM.

The backup control circuit 15 deactivates the main memory 17 when the low voltage detection circuit 25 to be described below detects a low voltage condition. On the other hand, the main memory 17 is supplied with a power supply voltage from the battery 41. Accordingly, the data stored in the main memory 17 composed of the SRAM can be maintained even after the power supply voltages Vcc0 and Vcc1 are taken away.

The first bus arbiter 13 accepts first bus use request signals from the respective bus masters of the first bus 31, performs bus arbitration among the requests, and issues a first bus use acknowledge signal to one of the respective bus masters. More specifically speaking, while there are multiple sets of priority level information relating to the priority levels (priority rankings) assigned to a plurality of the bus masters in regard to the use of the first bus 31, the first bus arbiter 13 performs arbitration on the basis of one of the multiple sets of priority level information which is sequentially and cyclically selected.

Each bus master is permitted to access the first bus 31 after receiving the first bus use acknowledge signal. In this example, the first bus use request signal and the first bus use acknowledge signal are illustrated as first bus arbitration signals "FAB" in FIG. 1.

The arbitration by the first bus arbiter 13 will be explained in detail.

FIG. 2 is a view showing an example of a priority level table for use in the first bus arbiter 13 of FIG. 1. While four sets of priority level information are prepared for accessing the first bus 31, each set is encoded respectively into one of priority level information numbers 0 to 3 of two bits. In FIG. 2, the priority level table provides an example of how to convert each of the priority level information numbers 0 to 3 into the corresponding priority level information set.

In this case, each of the bus masters (the CPU 1, the graphics processor 3, the pixel plotter 5, the sound processor 7 and the DMA controller 9) outputs a bus use request corresponding to each purpose of using the first bus 31 (referred to as a "first bus use request purpose" in the following description). Accordingly, each of the priority level information sets designated by one of the priority level information numbers 0 to 3 indicates the priority levels of all the first bus use request purposes. Since there are 12 kinds of the first bus use request purposes in the case of the present embodiment, each of the priority level information sets designates the first priority level to the 12th priority level. The priority levels of accessing the first bus 31 include the first priority level which is the highest priority level while the priority decreases as the number of the priority level increases.

The first bus arbiter 13 sequentially and cyclically selects one of 16 priority level registers each of which stores one of the priority level information numbers 0 to 3, and performs the arbitration of requests for access to the first bus 31 on the basis of the priority level information set corresponding to the priority level information number stored in the priority level register as selected. In this case, the first bus arbiter 13 performs the access arbitration for the respective first bus use request purposes.

In this example as illustrated in the figure, the abbreviations of the bus masters, i.e., "CPU", "GP", "SP", "DMA" and "PLT" stand respectively for the CPU 1, the graphics processor 3, the sound processor 7, the DMA controller 9 and the pixel plotter 5.

Also, the abbreviations of the first bus use request purposes in the figure, i.e., "IST", "DAT", "TX1", "TX2", "SPR", "HDR", "CHR", "BMP", "WAV", "ENV", "DMAD" and "PLT" stand respectively for "instruction fetch", "data access", "first background array data", "second background array data", "sprite DMA", "character header", "character data", "bitmap data", "wave data", "envelope data", "DMA destination" and "pixel plotter". The respective first bus use request purposes have the following means.

The "Instruction fetch" corresponds to the first bus use request purpose that the CPU 1 fetches an instruction from the main memory 17.

The "data access" corresponds to the first bus use request purpose that the CPU 1 accesses (reads/writes data from/to) the resources connected to the first bus 31.

The "first background array data" corresponds to the first bus use request purpose that the graphics processor 3 acquires array data of the first background screen from the main memory 17. The array data of this example contains address information of character pattern data of all characters in the first background screen, and may include color palette information and depth information.

The "second background array data" corresponds to the first bus use request purpose that the graphics processor 3 acquires array data of the second background screen from the main memory 17. The array data of this example contains the address information of character pattern data of all characters in the second background screen, and may include color palette information and depth information.

The "sprite DMA" corresponds to the first bus use request purpose that the graphics processor 3 reads from the main memory 17 data to be transferred to a sprite memory (not shown in the figure, but located in the graphics processor 3).

The "character header" corresponds to the first bus use request purpose that the graphics processor 3 acquires a character header from the main memory 17. The character header consists of color palette information, information about the number of bits per pixel (M bits/pixel) of the character, flip information and so forth.

The "character data" corresponds to the first bus use request purpose that the graphics processor 3 acquires character pattern data from the main memory 17.

The "bitmap data" corresponds to the first bus use request purpose that the graphics processor 3 reads bitmap data from the main memory 17.

The "wave data" corresponds to the first bus use request purpose that the sound processor 7 acquires wave data from the main memory 17.

The "envelope data" corresponds to the first bus use request purpose that the sound processor 7 acquires envelope data from the main memory 17 and writes, to the main memory 17, the read pointer to a FIFO (first-in first-out) buffer for envelope data which is virtually provided in the main memory 17.

The "DMA destination" corresponds to the first bus use request purpose that the DMA controller 9 writes data to the main memory 17.

The "pixel plotter" corresponds to the first bus use request purpose that the pixel plotter 5 performs read/write operations from/to the main memory 17.

Next, the method of preparing the priority level table shown in FIG. 2 will be explained. First, after providing permutations of the five bus masters, four permutations (referred to as the bus master permutations) are selected taking into consideration the amounts of data transmitted to/from the respective bus masters and the frequencies of using the bus by the respective bus masters. On the other hand, after providing permutations (referred to as the bus use request purpose permutations) of the bus use request purposes for each bus master, one bus use request purpose permutation for each bus master (referred to as the bus use request purpose permutation) is selected taking into consideration the amounts of data transmitted to/from each bus master and the frequencies of using the bus by each bus master.

Then, the priority level table is created by combining the bus use request purpose permutations for the respective bus master permutations. This will be explained in accordance with a specific example.

It is assumed that one of the selected four bus master permutations is {SP, GP, PLT, DMA, CPU} by the use of the abbreviations shown in FIG. 2. On the other hand, also by the use of the abbreviations shown in FIG. 2, the bus use request purpose permutation as selected of the sound processor 7 is {WAV, ENV}; the bus use request purpose permutation as selected of the graphics processor 3 is {BMP, CHR, HDR, SPR, TX1, TX2}; the bus use request purpose permutation as selected of the pixel plotter 5 is {PLT} (this is because there is only one bus use request purpose for accessing the first bus 31 by the pixel plotter 5); the bus use request purpose permutation as selected of the DMA controller 9 is {DMAD} (for the same reason as that of the pixel plotter 5); and the bus use request purpose permutation as selected of the CPU 1 is {DAT, IST}.

In this case, there are combined the bus use request purpose permutation {WAV, ENV} for "SP" of the bus master permutation, the bus use request purpose permutation {BMP, CHR, HDR, SPR, TX1, TX2} for "GP" of the bus master permutation, the bus use request purpose permutation {PLT} for "PLT" of the bus master permutation, the bus use request purpose permutation {DMAD} for "DMA" of the bus master permutation, and the bus use request purpose permutation {DAT, IST} for "CPU" of the bus master permutation. As a result, the priority level information set "0" as illustrated in FIG. 2 is prepared for the first bus 31.

Returning to FIG. 1, the first bus 31 consists of an 8-bit first data bus 311, an 15-bit first address bus 312, and a first control bus 313 (refer to FIG. 4 as described below).

The second bus arbiter 14, which is related to one of the characteristic features of the present invention, accepts second bus use request signals from the respective bus masters of the second bus 33, performs bus arbitration among the requests, and issues a second bus use acknowledge signal to one of the respective bus masters. More specifically speaking, while there are multiple sets of priority level information relating to the priority levels (priority rankings) assigned to a plurality of the bus masters in regard to the use of the second bus 33, the second bus arbiter 14 performs arbitration on the basis of one of the multiple sets of priority level information which is sequentially and cyclically selected.

Each bus master is permitted to access the second bus 33 after receiving the second bus use acknowledge signal. In this example, the second bus use request signal and the second bus use acknowledge signal are illustrated as second bus arbitration signals "SAB" in FIG. 1.

Next, the second bus arbiter 14 will be explained in detail.

FIG. 3 is a view showing an example of a priority level table containing a plurality of priority level information sets for use in the second bus arbiter 14 of FIG. 1. While four sets of priority level information are prepared for accessing the second bus 33, each set is encoded respectively into one of priority level information numbers 0 to 3 of two bits. In FIG. 3, an exemplary priority level table is shown in which the priority level information set is obtained corresponding to each of the priority level information numbers 0 to 3.

In this case, each of the bus masters (the CPU 1, the graphics processor 3, the pixel plotter 5, the sound processor 7 and the DMA controller 9) outputs a bus use request corresponding to each purpose of using the second bus 33 (referred to as a "second bus use request purpose" in the following description). Accordingly, each of the priority level information sets designated by one of the priority level information numbers 0 to 3 indicates the priority levels of all the second bus use request purposes. Since there are 9 kinds of the second bus use request purpose in the case of the present embodiment, each of the priority level information sets designates the first priority level to the ninth priority level. The priority levels of accessing the second bus 33 include the first priority level which is the highest priority level while the priority decreases as the number of the priority level increases.

The second bus arbiter 14 sequentially and cyclically selects one of 8 priority level registers 200 to 207 (to be described below) each of which stores one of the priority level information numbers 0 to 3, and performs the arbitration of requests for access to the second bus 33 on the basis of the priority level information set corresponding to the priority level information number stored in the priority level register as selected. In this case, the second bus arbiter 14 performs the access arbitration for the respective second bus use request purposes.

In this example as illustrated in this figure, the bus masters and the second bus use request purposes are given the same abbreviations as in FIG. 2.

However, the abbreviation "DMAS" of the second bus use request purpose stands for "DMA source" while the respective second bus use request purposes have the following means.

The "Instruction fetch" corresponds to the second bus use request purpose that the CPU 1 fetches instructions from the external memory 45.

The "data access" corresponds to the second bus use request purpose that the CPU 1 accesses (reads/writes data from/to) the external memory 45.

The "character header" corresponds to the second bus use request purpose that the graphics processor 3 acquires a character header from the external memory 45.

The "character data" corresponds to the second bus use request purpose that the graphics processor 3 acquires character pattern data from the external memory 45.

The "bitmap data" corresponds to the second bus use request purpose that the graphics processor 3 reads bitmap data from the external memory 45.

The "pixel plotter" corresponds to the second bus use request purpose that the pixel plotter 5 performs read/write operations from/to the external memory 45.

The "wave data" corresponds to the second bus use request purpose that the sound processor 7 acquires wave data from the external memory 45.

The "envelope data" corresponds to the second bus use request purpose that the sound processor 7 acquires envelope data from the external memory 45.

The "DMA source" corresponds to the second bus use request purpose that the DMA controller 9 reads data from the external memory 45.

The method of preparing the priority level table shown in FIG. 3 is same as the method of preparing the priority level table shown in FIG. 2, and therefore no redundant description is repeated.

Returning to FIG. 1, the second bus 33 consists of a 16-bit second data bus, an 27-bit second address bus, and a second control bus (not shown in the figure).

The timer circuit 19 has the function of repeatedly outputting an interrupt request signal "INRQ" to the CPU 1 with a predetermined interval. The setting of the time interval and so forth is performed by the CPU 1 through the first bus 31.

The ADC 20 converts an analog input signal to a digital signal. This digital signal is read by the CPU 1 through the first bus 31. In addition, the ADC 20 has a function of outputting an interrupt request signal "INRQ" to the CPU 1.

In addition, an analog signal as output from an external device is input to the ADC 20, for example, through six analog ports AIN0 to AIN5 (not shown in the figure). The input/output control circuit 21 serves to perform the input and output operations of input and output signals to enable the communication with external input/output devices and/or external semiconductor devices. The read and write operations of input and output signals are controlled by the CPU 1 through the first bus 31. Also, the input/output control circuit 21 has the function of outputting an interrupt request signal "INRQ" to the CPU 1. Incidentally, the input and output signals are input and output, for example, through programmable input/output ports IO0 to IO23 (not shown in the figure).

The low voltage detection circuit 25 monitors the power supply voltages Vcc0 and Vcc1, and issues a reset signal to the PLL circuit 27 and a reset signal "RSET" to the other circuit elements of the entire system when either the power supply voltage Vcc0 or Vcc1 falls below corresponding one of reference voltages which are determined in advance individually for the respective power supply voltages Vcc0 and Vcc1.

The power supply voltage Vcc0 is for example +2.5 V, which is supplied mainly to digital circuits in the processor. On the other hand, the power supply voltage Vcc1 is for example +3.3 V, which is supplied mainly to analog circuits and I/O circuits in the processor.

The PLL circuit 27 generates a high frequency clock signal by multiplication of the sinusoidal signal as obtained from a crystal oscillator 37.

The clock driver 29 amplifies the high frequency clock signal as received from the PLL circuit 27 to a sufficient driving capability to supply the respective blocks with the amplified high frequency clock signal as an internal clock signal "ICLK".

The external memory interface circuit 23 has a function of connecting the second bus 33 to the external bus 43.

Next, the data transfer paths within the processor shown in FIG. 1 will be explained. For example, in the case where the CPU 1 controls, as a bus master, one of the other functional blocks (the graphics processor 3, the pixel plotter 5, the sound processor 7, the DMA controller 9, the first bus arbiter 13, the second bus arbiter 14 and the like) respectively connected to the first bus 31 as a bus slave, the CPU 1 outputs write data to the first bus arbiter 13 for writing the write data to the control register of the functional block and, after arbitration, the first bus arbiter 13 transmits the write data to the control register through the first bus 31, while the CPU 1 receives read data transmitted from the control register of the functional block after arbitration through the first bus 31 and the first bus arbiter 13. On the other hand, each of the graphics processor 3, the pixel plotter 5, the sound processor 7 and the DMA controller 9 has the function of outputting first bus use request signal to the first bus arbiter 13 as a bus master of the first bus 31.

When accessing the main memory 17, a bus master outputs write data to the first bus arbiter 13 for writing the write data to the main memory 17 and the first bus arbiter 13 transmits the write data to the main memory 17 after arbitration through the first bus 31, while a bus master receives read data from the main memory 17 after arbitration through the first bus 31 and the first bus arbiter 13. Also, when accessing the external memory 45, a bus master outputs write data to the second bus arbiter 14 for writing the write data to the external memory 45 and the second bus arbiter 14 transmits the write data to the external memory 45 after arbitration through the second bus 33, the external memory interface circuit 23 and the external bus 43, while a bus master receives read data from the external memory 45 after arbitration through the external bus 43, the external memory interface circuit 23, the second bus 33 and the second bus arbiter 14.

In what follows, the second bus arbiter 14 shown in FIG. 1 will be explained in detail.

Figure 4:
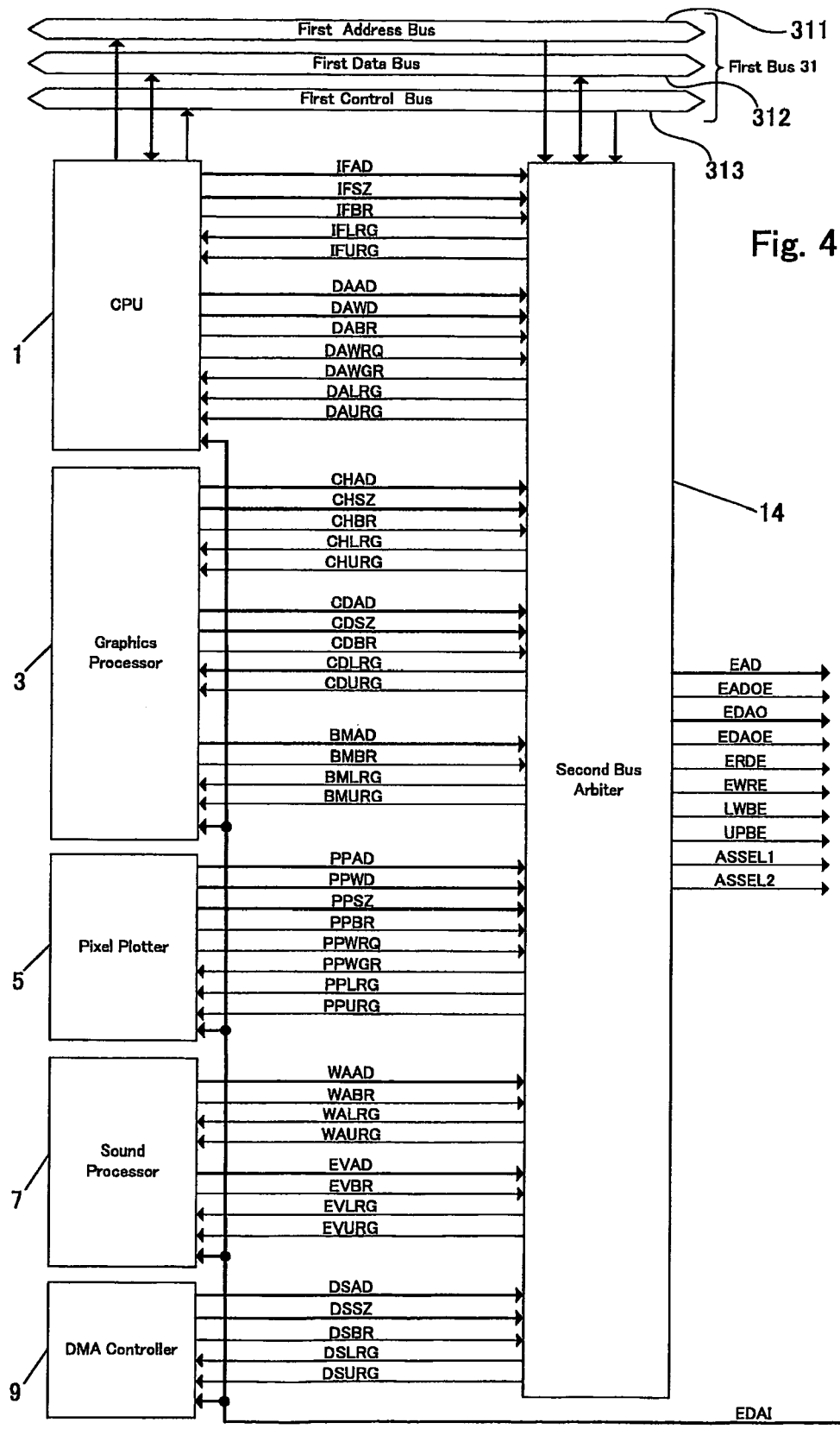
FIG. 4 is a view for explaining the input and output signals of the second bus arbiter in accordance with the embodiment of the present invention shown in FIG. 1.

FIG. 4 is a view for explaining the input and output signals of the second bus arbiter 14 shown in FIG. 1.

As illustrated in FIG. 4, the CPU 1 serves to control the second bus arbiter 14 through the first address bus 311, the first data bus 312 and the first control bus 313.

A data access address "DAAD" output from the CPU 1 to the second bus arbiter 14, a data access write data "DAWD" output from the CPU 1 to the second bus arbiter 14, a data access bus use request signal "DABR" output from the CPU 1 to the second bus arbiter 14, a data access write request signal "DAWRQ" output from the CPU 1 to the second bus arbiter 14, a data access write acknowledge signal "DAWGR" output from the second bus arbiter 14 to the CPU 1, a data access lower byte read acknowledge signal "DALRG" output from the second bus arbiter 14 to the CPU 1 and a data access upper byte read acknowledge signal "DAURG" output from the second bus arbiter 14 to the CPU 1 are, respectively in the case where the second bus use request purpose is "data access", the first address of read or write operation, data to be written, a signal indicative of a bus use request for reading or writing data, a signal indicating that the bus use request is issued for writing data, a signal indicating that a bus use request for writing data is accepted, a signal indicating that a bus use request for reading data is accepted and that the lower bytes ([7:0]) of an external data input signal "EDAI" can be fetched, and a signal indicating that a bus use request for reading data is accepted and that the upper bytes ([15:8]) of the external data input signal "EDAI" can be fetched.

A character header address "CHAD" output from the graphics processor 3 to the second bus arbiter 14, a character header size signal "CHSZ" output from the graphics processor 3 to the second bus arbiter 14, a character header bus use request signal "CHBR" output from the graphics processor 3 to the second bus arbiter 14, a character header lower byte read acknowledge signal "CHLRG" output from the second bus arbiter 14 to the graphics processor 3 and a character header upper byte read acknowledge signal, "CHURG" output from the second bus arbiter 14 to the graphics processor 3 are, respectively in the case where the second bus use request purpose is "character header", the first address of read operation, a signal indicative of the amount of data to be request (the signal indicative of the number of bytes to be read), a signal indicative of a bus use request for reading data, a signal indicating that a bus use request for reading data, is accepted and that the lower bytes ([7:0]) of an external data input signal "EDAI" can be fetched, and a signal indicating that a bus use request for reading data is accepted and that the upper bytes ([15:8]) of the external data input signal "EDAI" can be fetched.

A character data address "CDAD" output from the graphics processor 3 to the second bus arbiter 14, a character data size signal "CDSZ" output from the graphics processor 3 to the second bus arbiter 14, a character data bus use request signal "CDBR" output from the graphics processor 3 to the second bus arbiter 14, a character data lower byte read acknowledge signal "CDLRG" output from the second bus arbiter 14 to the graphics processor 3 and a character data upper byte-read acknowledge signal "CDURG" output from the second bus arbiter 14 to the graphics processor 3 are, respectively in the case where the second bus use request purpose is "character data", the first address of read operation, a signal indicative of the amount of data to be request (the signal indicative of the number of bytes to be read), a signal indicative of a bus use request for reading data, a signal indicating that a bus use request for reading data is accepted and that the lower bytes ([7:0]) of an external data input signal "EDAI" can be fetched, and a signal indicating that a bus use request for reading data is accepted and that the upper bytes ([15:8]) of the external data input signal "EDAI" can be fetched.

A bitmap data address "BMAD" output from the graphics processor 3 to the second bus arbiter 14, a bitmap data bus use request signal "BMBR" output from the graphics processor 3 to the second bus arbiter 14, a bitmap data lower byte read acknowledge signal "BMLRG" output from the second bus arbiter 14 to the graphics processor 3 and a bitmap data upper byte read acknowledge signal "BMURG" output from the second bus arbiter 14 to the graphics processor 3 are, respectively in the case where the second bus use request purpose is "bitmap data", the first address of read operation, a signal indicative of the amount of data to be requested (the signal indicative of the number of bytes to be read), a signal indicative of a bus use request for reading data, a signal indicating that a bus use request for reading data is accepted and that the lower bytes ([7:0]) of an external data input signal "EDAI" can be fetched, and a signal indicating that a bus use request for reading data is accepted and that the upper bytes ([15:8]) of the external data input signal "EDAI" can be fetched.

A pixel plotter address "PPAD" output from the pixel plotter 5 to the second bus arbiter 14, a pixel plotter write data "PPWD" output from the pixel plotter 5 to the second bus arbiter 14, a pixel plotter size signal "PPSZ" output from the pixel plotter 5 to the second bus arbiter 14, a pixel plotter bus use request signal "PPBR" output from the pixel plotter 5 to the second bus arbiter 14, a pixel plotter write request signal "PPWRQ" output from the pixel plotter 5 to the second bus arbiter 14, a pixel plotter write acknowledge signal "PPWGR" output from the second bus arbiter 14 to the pixel plotter 5, a pixel plotter lower byte read acknowledge signal "PPLRG" output from the second bus arbiter 14 to the pixel plotter 5 and a pixel plotter upper byte read acknowledge signal "PPURG" output from the second bus arbiter 14 to the pixel plotter 5 1 are, respectively in the case where the second bus use request purpose is "pixel plotter", the first address of read or write operation, data to be written, a signal indicative of the amount of data to be requested (the signal indicative of the number of bytes to be read), a signal indicative of a bus use request for reading or writing data, a signal indicating that the bus use request is issued for writing data, a signal indicating that a bus use request for writing data is accepted, a signal indicating that a bus use request for reading data is accepted and that the lower bytes ([7:0]) of an external data input signal "EDAI" can be fetched, and a signal indicating that a bus use request for reading data is accepted and that the upper bytes ([15:8]) of the external data input signal "EDAI" can be fetched.

A wave data address "WAAD" output from the sound processor 7 to the second bus arbiter 14, a wave data bus use request signal "WABR" output from the sound processor 7 to the second bus arbiter 14, a wave data lower byte read acknowledge signal "WALRG" output from the second bus arbiter 14 to the sound processor 7 and a wave data upper byte read acknowledge signal "WAURG" output from the second bus arbiter 14 to the sound processor 7 are, respectively in the case where the second bus use request purpose is "wave data", the first address of read operation, a signal indicative of a bus use request for reading data, a signal indicating that a bus use request for reading data is accepted and that the lower bytes ([7:0]) of an external data input signal "EDAI" can be fetched, and a signal indicating that a bus use request for reading data is accepted and that the upper bytes ([15:8]) of the external data input signal "EDAI" can be fetched.

An envelope data address "EVAD" output from the sound processor 7 to the second bus arbiter 14, an envelope data bus use request signal "EVBR" output from the sound processor 7 to the second bus arbiter 14, an envelope data lower byte read acknowledge signal "EVLRG" output from the second bus arbiter 14 to the sound processor 7 and an envelope data upper byte read acknowledge signal "EVURG" output from the second bus arbiter 14 to the sound processor 7 are, respectively in the case where the second bus use request purpose is "envelope data", the first address of read operation, a signal indicative of a bus use request for reading data, a signal indicating that a bus use request for reading data is accepted and that the lower bytes ([7:0]) of an external data input signal "EDAI" can be fetched, and a signal indicating that a bus use request for reading data is accepted and that the upper bytes ([15:8]) of the external data input signal "EDAI" can be fetched.

A DMA source address "DSAD" output from the DMA controller 9 to the second bus arbiter 14, a DMA source size signal "DSSZ" output from the DMA controller 9 to the second bus arbiter 14, a DMA source bus use request signal "DSBR" output from the DMA controller 9 to the second bus arbiter 14, a DMA source lower byte read acknowledge signal "DSLRG" output from the second bus arbiter 14 to the DMA controller 9 and a DMA source upper byte read acknowledge signal "DSURG" output from the second bus arbiter 14 to the DMA controller 9 are, respectively in the case where the second bus use request purpose is "DMA source", the first address of read operation, a signal indicative of the amount of data to be requested (the signal indicative of the number of bytes to be read), a signal indicative of a bus use request for reading data, a signal indicating that a bus use request for reading data is accepted and that the lower bytes ([7.0]) of an external data input signal "EDAI" can be fetched, and a signal indicating that a bus use request for reading data is accepted and that the upper bytes ([15:8]) of the external data input signal "EDAI" can be fetched.

Here, each of the above address signals "IFAD", "DAAD", "CHAD", "CDAD", "BMAD", "PPAD", "WAAD", "EVAD" and "DSAD" is a 27-bit signal. Also, each of the above write data "DAWD" and "PPWD" is a 16-bit signal. However, the effective data of the write data "DAWD" is the lower 8 bits of the 16-bit signal.

FIG. 5 is a view showing exemplary sizes of data as requested for the respective second bus use request purposes. As shown in FIG. 5, in the case where the second bus use request purpose is "instruction fetch", the CPU 1 can request 1, 2, 3 and 4 bytes as a data transmission size by outputting the instruction fetch size signal "IFSZ" (variable data size).

Accordingly, the CPU 1 can dynamically designate a data transmission size corresponding to the size of the instruction to be fetched by the instruction fetch size signal "IFSZ".

In the case where the second bus use request purpose is "data access", the data transmission size is fixed to one byte. In the case where the second bus use request purpose is "character header", the graphics processor 3 can request 0 byte as a data transmission size by the character header size signal "CHSZ" (i.e., no data is transferred).

In the case where the second bus use request purpose is "character data", the graphics processor 3 can request 1, 2, 3, . . . 15 or 16 bytes as a data transmission size by the character data size signal "CDSZ" (variable data transmission).

There are characters of varied sizes, such as 8×8 pixels, 8×16 pixels, 16×8 pixels, 16×16 pixels and so forth. Also, there are a variety of modes corresponding to varied sizes of data per pixel such as 1, 2, 3, . . . 7 or 8 bits. Accordingly, the graphics processor 3 can dynamically designate a data transmission size corresponding to the size of a character and the size of data per pixel by the character data size signal "CDSZ".

In the case where the second bus use request purpose is "bitmap data", the data transmission size is fixed to 8 bytes.

In the case where the second bus use request purpose is "pixel plotter", the pixel plotter 5 can request 1 or 2 bytes as a data transmission size by the pixel plotter size signal "PPSZ" (variable data size).

For example, in the case where the starting address has "1" as its LSB (least significant bit), the pixel plotter 5 designates one byte as a data transmission size for starting the access by the pixel plotter size signal "PPSZ", otherwise the pixel plotter 5 designates 2 bytes as a data transmission size by the pixel plotter size signal "PPSZ". This is because it is useless to read/write the lower byte in the case of this one-byte access.

In the case where the second bus use request purpose is "wave data", the data transmission size is fixed to one byte.

In the case where the second bus use request purpose is "envelope data", the data transmission size is fixed to one byte. In the case where the second bus use request purpose is "DMA source", the DMA controller 9 can request 1, 2, 3 and 4 bytes as a data transmission size by the DMA source size signal "DSSZ" (variable size).

Accordingly, the DMA controller 9 can dynamically designate a data transmission size corresponding to the size of the data to be transferred from the DMA source by the DMA source size signal "DSSZ".

Returning to FIG. 4, the second bus arbiter 14 serves to output to the second bus 33 an external address "EAD", an external address output enable signal "EADOE", external data "EDAO", an external data output enable signal "EDAOE", an external read enable signal "ERDE", an external write enable signal "EWRE", a lower byte enable signal "LWBE", an upper byte enable signal "UPBE", a first area select signal "ASSEL1" and a second area select signal "ASSEL2".

The external address "EAD" is an address signal (27 bits) to be output to the second address bus (not shown in the figure) of the second bus 33. The external address output enable signal "EADOE" controls a tri-state buffer (not shown in the figure) of the second address bus of the second bus 33 to switch between an output state and an Hi-Z (high impedance) state.

The external data "EDAO" is data (16 bits) to be output to the second data bus (not shown in the figure) of the second bus 33. The external data output enable signal "EDAOE" controls a tri-state buffer (not shown in the figure) of the second data bus of the second bus 33 to switch between an output state and an Hi-Z (high impedance) state.

The external read enable signal "ERDE" is a read enable signal to be output to the second control bus (not shown in the figure) of the second bus 33. The external write enable signal "EWRE" is a write enable signal to be output to the second control bus of the second bus 33.

The lower byte enable signal "LWBE" is a lower byte enable signal of the second data bus of the second bus 33. The upper byte enable signal "UPBE" is an upper byte enable signal of the second data bus of the second bus 33.

The first area select signal "ASSEL1" is a signal for selecting the second bus first area of the logical address space of the processor 100. The second area select signal "ASSEL2" is a signal for selecting the second bus second area of the logical address space of the processor 100. Incidentally, the external address "EAD[22]" serves as a signal for selecting the second bus zeroth area of the second bus (the zeroth area select signal "ASSEL0").

Next, the address space of the processor 100 will be explained. The processor 100 is able to output an address signal of 27 bits, i.e., has a logical address space of 128 MB. The first bus 31 serves to transmit a 15-bit address "IAD", i.e., has a physical address space of 32 KB. The second bus 33 has a physical address space of 96 MB corresponding to a 27-bit address space a part of which is excluded therefrom. This point will be explained with reference to a drawing.

Figure 6:
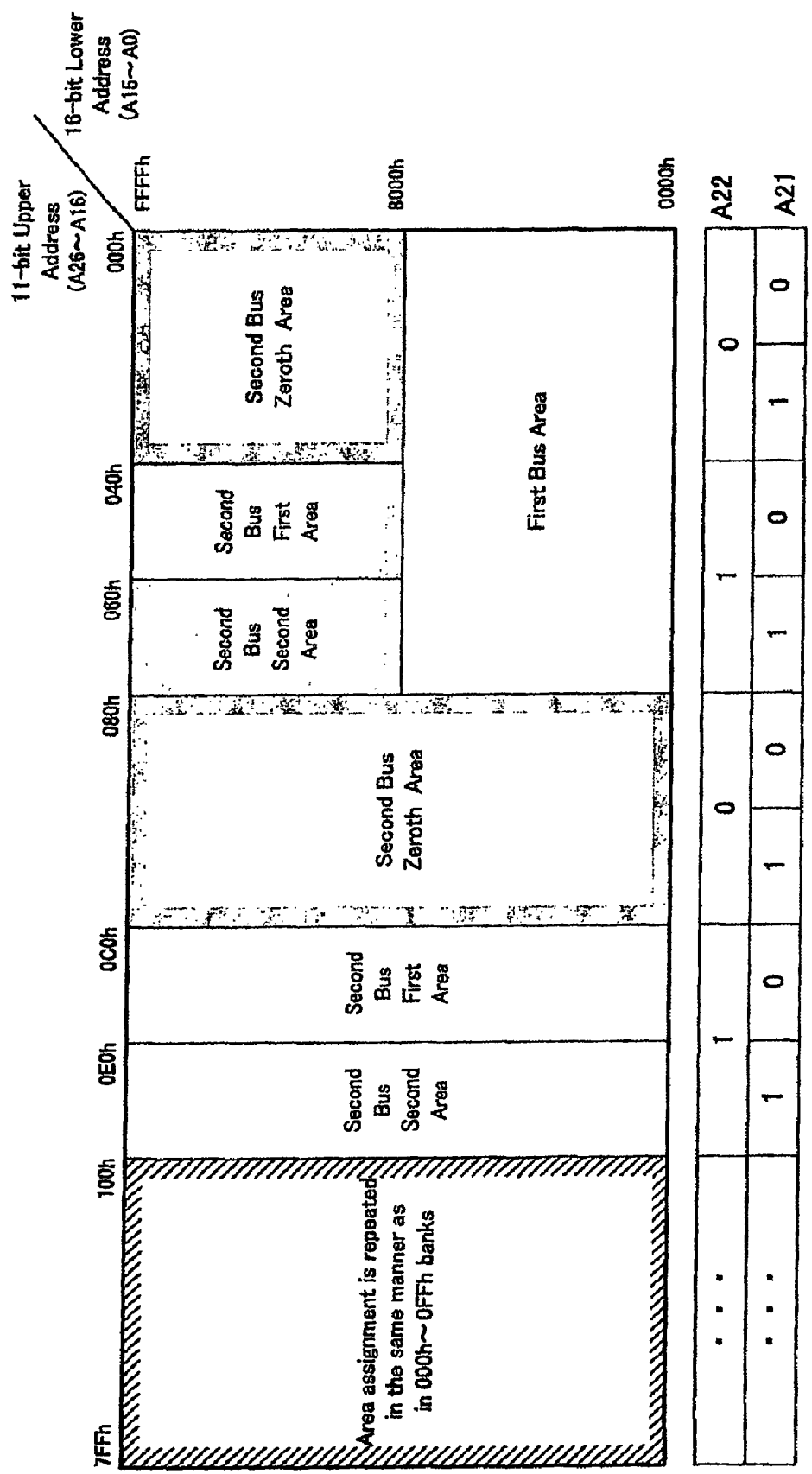
FIG. 6 is a view for explaining the logical address space of the processor in accordance with the embodiment of the present invention shown in FIG. 1.

FIG. 6 is a view for explaining the logical address space of the processor 100 of FIG. 1. As illustrated in FIG. 6, the 27 bits of the address are mainly, divided into the upper 11 bits A26 to A16 and the lower 16 bits A15 to A0, wherein the upper 11 bits serves to form a bank address. Namely, the logical address space of 128 MB is divided into 2048 unit spaces (data blocks) of 64 KB each of which is called a bank, so that, for example, the address "FFFFh" of the "000h" bank and the address "0000h" of the "001h" bank cannot be continuously accessed by the CPU 1 and the sound processor 7. For this reason, the respective banks are illustrated in parallel in FIG. 6 for the purpose of visualizing this fact.

The logical address space of the processor 100 is mainly divided into four areas, i.e., a first bus area corresponding to the physical address space of the first bus 31, and the second bus zeroth area, the second bus first area, the second bus second area respectively corresponding to the physical address space of the second bus 33.

Figure 7:
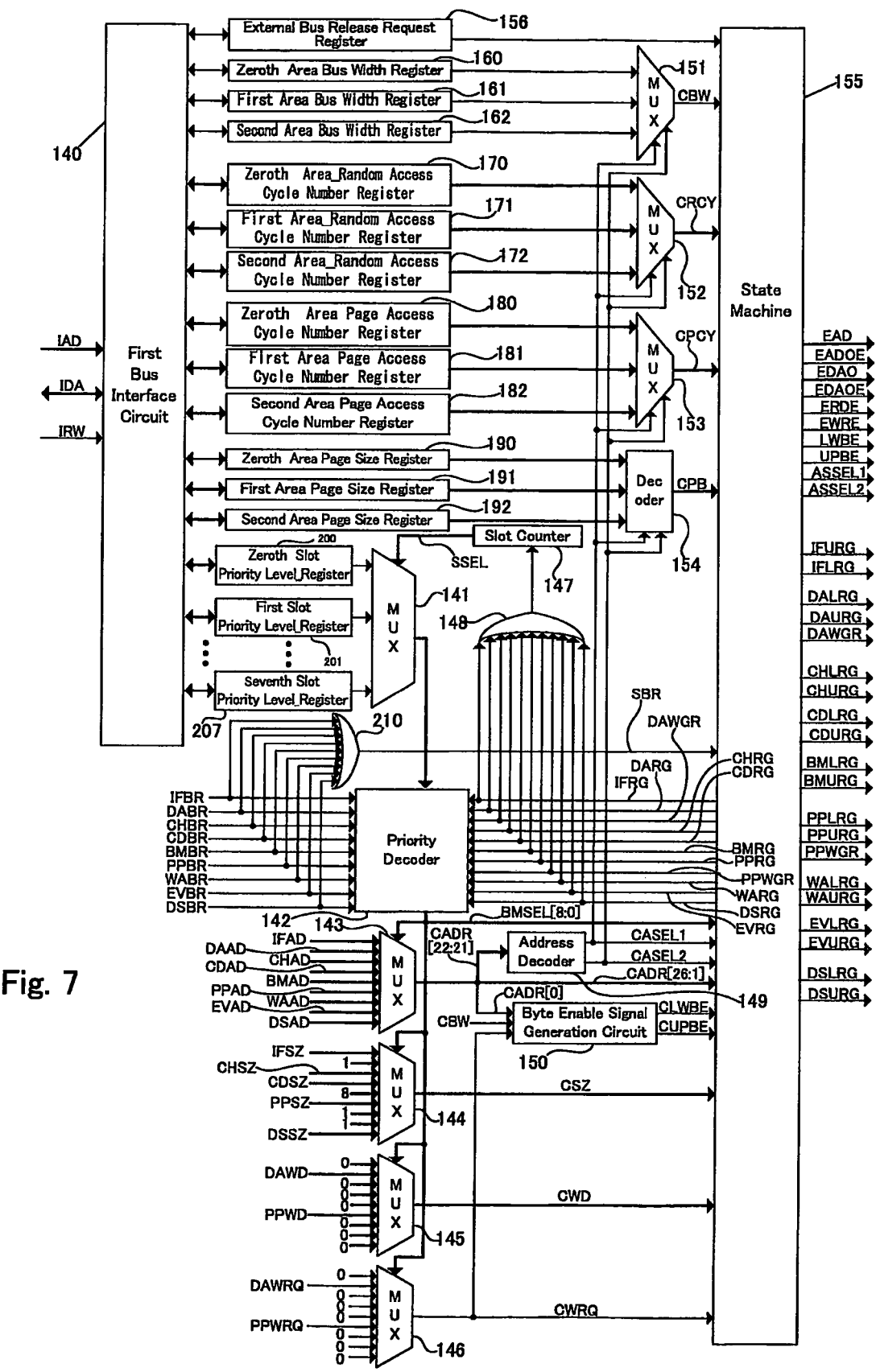
FIG. 7 is a block diagram showing the internal configuration of the second bus arbiter in accordance with the embodiment of the present invention of FIG. 4.

FIG. 7 is a block diagram showing the internal configuration of the second bus arbiter 14 of FIG. 4. As shown in FIG. 7, the second bus arbiter 14 includes a first bus interface circuit 140, a multiplexer 141, an OR gate 210, a priority decoder 142, multiplexers 143 to 146, a slot counter 147, an OR gate 148, an address decoder 149, a byte enable signal generation circuit 150, multiplexers 151 to 153, a decoder 154, a state machine 155, an external bus release request register 156, a zeroth area bus width register 160, a first area bus width register 161, a second area bus width register 162, a zeroth area random access cycle number register 170, a first area random access cycle number register 171, a second area random access cycle number register 172, a zeroth area page access cycle number register 180, a first area page access cycle number register 181, a second area page access cycle number register 182, a zeroth area page size register 190, a first area page size register 191, a second area page size register 192, and a zeroth slot priority level register 200 to a seventh slot priority level register 207.

The first bus interface circuit 140 is an interface to connect the first bus 31 with the respective control registers 156, 160 to 162, 170 to 172, 180 to 182, 190 to 192 and 200 to 207.

In this description, the term "control register CR" is used to generally represent the control registers 156, 160 to 162, 170 to 172, 180 to 182, 190 to 192 and 200 to 207.

The CPU 1 can write data to or read data from the control register CR through the first bus 31 and the first bus interface circuit 140. More specific description is as follows.

The internal address "IAD" is a signal indicative of an address of the first bus 31 to which control registers of functional blocks and memory areas for functional blocks are assigned and, for example, this signal is a 15-bit signal in the case of the present embodiment. In other words, the bus width of the first address bus 311 is 15 bits. This internal address "IAD" is given to the first address bus 311 from a bus master. When the CPU 1 controls the second bus arbiter 14, the internal address "IAD" is given to the second bus arbiter 14 from the CPU 1 serving as a bus master through the first address bus 311.

In the first bus area (the area of the first bus 31), there are allocated areas for the first bus arbiter 13 (control registers), the second bus arbiter 14 (control registers CR), the CPU 1 (control registers), the sound processor 7 (local memory and control registers), the graphics processor 3 (control registers, a pallet memory, a sprite memory), the main memory 17 and the pixel plotter 5 (control registers). On the other hand, in the second bus area (the area of the second bus 33), there are allocated areas for the external memory 45 and the like.

The CPU 1 outputs an internal read/write signal "IRW" to the first bus interface circuit 140 through the first control bus 313. The internal read/write signal "IRW" is a signal indicative of the purpose of accessing the control register CR located in the second bus arbiter 14. For example, the internal read/write signal "IRW" is output as a high level signal for reading data and a low level signal for writing data.

The internal data "IDA" is data which is given to the first bus interface circuit 140 from the CPU 1 serving as a bus master through the first data bus 312, or data which is given to the CPU 1 serving as a bus master from the first bus interface circuit 140 through the first data bus 312. In the case of the present embodiment, for example, the internal data "IDA" consists of an 8-bit signal. In other words, the bus width of the first data bus 312 is 8 bits.

The CPU 1 designates a read or write operation by the internal read/write signal "IRW" to access the control register CR of the second bus arbiter 15 as designated by the internal address "IAD".

By the way, the value of the external bus release request register 156 is input to the state machine 155. When the external bus release request register 15 is set to a "1" by the CPU 1, the state machine 155 puts an address bus, a data bus and a control bus (not shown in the figure) of the external bus 43 respectively in a high impedance state. For example, in the case where an external bus use request is issued by another device sharing the external bus 43 with the processor 100, the external bus release request register 15 is set to a "1".

The zeroth area bus width register 160 is set to the information indicative of the bus width of the data bus for use in accessing the second bus zeroth area. The first area bus width register 161 is set to the information indicative of the bus width of the data bus for use in accessing the second bus first area. The second area bus width register 162 is set to the information indicative of the bus width of the data bus for use in accessing the second bus second area. In the case of the present embodiment, each of the zeroth area bus width register 160, the first area bus width register 161 and the second area bus width register 162 can be set to the information indicative of an 8-bit bus width or a 16-bit bus width.

The zeroth area random access cycle number register 170 is set to the information indicative of the access cycle number (the number of clock cycles) corresponding to the bus cycle period required for accessing the second bus zeroth area in a random access mode. The first area random access cycle number register 171 is set to the information indicative of the access cycle number (the number of clock cycles) corresponding to the bus cycle period required for accessing the second bus first area in a random access mode. The second area random access cycle number register 172 is set to the information indicative of the access cycle number (the number of clock cycles) corresponding to the bus cycle period required for accessing the second bus second area in a random access mode. In this case, the bus cycle period (i.e., the period of one bus cycle) is designated in terms of the number of clock cycles of the internal clock signal "ICLK".

In the case of the present embodiment, each of the zeroth area random access cycle number register 170, the first area random access cycle number register 171 and the second area random access cycle number register 172 is set to the information indicative of 2 to 8 cycles of the internal clock signal "ICLK".

The zeroth area page access cycle number register 180 is set to the information indicative of the access cycle number (the number of clock cycles) corresponding to the bus cycle period required for accessing the second bus zeroth area in a page mode. The first area page access cycle number register 181 is set to the information indicative of the access cycle number (the number of clock cycles) corresponding to the bus cycle period required for accessing the second bus first area in a page mode. The second area page access cycle number register 182 is set to the information indicative of the access cycle number (the number of clock cycles) corresponding to the bus cycle period required for accessing the second bus second area in a page mode. In this case, the bus cycle period (i.e., the period of one bus cycle) is designated in terms of the number of clock cycles of the internal clock signal "ICLK".

In the case of the present embodiment, each of the zeroth area page access cycle number register 180, the first area page access cycle number register 181 and the second area page access cycle number register 182 is set to the information indicative of 1 to 4 cycles of the internal clock signal "ICLK".

The zeroth area page size register 190 is set to the information indicative of the page size required when the second bus zeroth area is accessed in a page mode. The first area page size register 191 is set to the information indicative of the page size required when the second bus first area is accessed in a page mode. The second area page size register 192 is set to the information indicative of the page size required when the second bus second area is accessed in a page mode. In the case of the present embodiment, each of the zeroth area page size register 190, the first area page size register 191 and the second area page size register 192 is set to the information indicative of 0, 4, 8 or 16 bytes.

The CPU 1 can set the values of the control registers 160 to 162, 170 to 172, 180 to 182 and 190 to 192 in accordance with the specification of the external memory 45. In addition, the CPU 1 can set the values of the control registers 160 to 162 independently from each other, the values of the control registers 170 to 172 independently from each other, the values of the control registers 180 to 182 independently from each other, and the values of the control registers 190 to 192 independently from each other.

Each of the zeroth slot priority level register 200 to the seventh slot priority level register 207 is set to one of the priority level information numbers 0 to 3 indicative of one of the priority level information sets 0 to 3 as illustrated in FIG. 3. For example, the zeroth slot priority level register 200 to the seventh slot priority level register 207 are set respectively to the priority level information number 1 corresponding to the priority level information set 1, the priority level information number 3 corresponding to the priority level information set 3, the priority level information number 1 corresponding to the priority level information set 1, the priority level information number 2 corresponding to the priority level information set 2, the priority level information number 1 corresponding to the priority level information set 1, the priority level information number 3 corresponding to the priority level information set 3, the priority level information number 1 corresponding to the priority level information set 1, and the priority level information number 0 corresponding to the priority level information set 0. Incidentally, the priority level information numbers 0 to 3 are encoded into 2-bit numbers respectively. Accordingly, each of the zeroth slot priority level register 200 to the seventh slot priority level register 207 is a 2-bit register.

The CPU 1 serves to arbitrarily set any one of the priority level information numbers 0 to 3 to each of the zeroth slot priority level register 200 to the seventh slot priority level register 207 in order to make a combination of eight numbers, which are alternately used on an 8-slot cycle.

The multiplexer 141 selects one of the zeroth slot priority level register 200 to the seventh slot priority level register 207 in accordance with the selection signal "SSEL" input from the slot counter 147 and outputs the priority level information number stored in the priority level register as selected to the priority decoder 142.

The CPU 1 outputs the instruction fetch bus use request signal "IFBR" and the data access bus use request signal "DABR" to the priority decoders 142 and the OR gate 210; the graphics processor 3 outputs the character header bus use request signal "CHBR", the character data bus use request signal "CDBR" and the bitmap data bus use request signal "BMBR" to the priority decoders 142 and the OR gate 210; the pixel plotter 5 outputs the pixel plotter bus use request signal "PPBR" to the priority decoders 142 and the OR gate 210; the sound processor 7 outputs the wave data bus use request signal "WABR" and the envelope data bus use request signal "EVBR" to the priority decoders 142 and the OR gate 210; and the DMA controller 9 outputs the DMA source bus use request signal "DSBR" to the priority decoders 142 and the OR gate 210. Also, the state machine 155 outputs, to the priority decoder 142, the instruction fetch read acknowledge signal "IFRG", the data access read acknowledge signal "DARG", the data access write acknowledge signal "DAWGR", the character header read acknowledge signal "CHRG", the character data read acknowledge signal "CDRG", the bitmap data read acknowledge signal "BMRG", the pixel plotter read acknowledge signal "PPRG", the pixel plotter write acknowledge signal "PPWGR", the wave data read acknowledge signal "WARG", the envelope data read acknowledge signal "EVRG" and the DMA source read acknowledge signal "DSRG".

In this description, the term "second bus use request signal BURQ" is used to generally represent the bus use request signals "IFBR", "DABR", "CHBR", "CDBR", "BMBR", "PPBR", "WABR", "EVBR" and "DSBR".

The priority decoder 142 serves to decode the priority level information number currently input from the multiplexer 141, and selects a bus master (to which the bus ownership of the second bus 33 is to be granted) having the highest priority from among the bus masters outputting the second bus use request signal "BURQ", except for the second bus use request purpose of the bus master which is currently using the second bus 33. More specific description is as follows.

The priority decoder 142 selects, in accordance with the priority level information set corresponding to the priority level information number as decoded, a second bus use request purpose having the highest priority from among the second bus use request purposes corresponding to the second bus use request signals "BURQ", which are asserted, except for the second bus use request purpose for which the second bus 33 is currently used. The second bus use request purpose for which the second bus is currently used can be determined on the basis of the states of the second bus use acknowledge signals "AGR" output from the state machine 155.

Meanwhile, the second bus use acknowledge signal "AGR" is used to generally represent the instruction fetch read acknowledge signal "IFRG", the data access read acknowledge signal "DARG", the data access write acknowledge signal "DAWGR", the character header read acknowledge signal "CHRG", the character data read acknowledge signal "CDRG", the bitmap data read acknowledge signal "BMRG", the pixel plotter read acknowledge signal "PPRG", the pixel plotter write acknowledge signal "PPWGR", the wave data read acknowledge signal "WARG", the envelope data read acknowledge signal "EVRG" and the DMA source read acknowledge signal "DSRG".

Also, the priority decoder 142 generates a bus master select signal "BMSEL[8:0]" on the basis of the second bus use request purpose as selected, and outputs it to the state machine 155 and the multiplexers 143 to 146. The respective bits of the bus master select signal "BMSEL[8:0]" correspond respectively to the nine second bus use request purposes. The priority decoder 142 sets the bit of the bus master select signal "BMSEL[8:0]" corresponding to the selected second bus use request purpose (to which the bus ownership of the second bus 33 is to be granted) to "1", and sets the remaining bits to "0". In other words, in accordance with the priority level information set corresponding to the priority level information number as decoded, the priority decoder 142 sets to "1" the bit corresponding to a second bus use request purpose having the highest priority from among the second bus use request purposes corresponding to the second bus use request signals "BURQ", which are asserted, except for the second bus use request purpose for which the second bus 33 is currently used.

The state machine 155 outputs to the OR gate 148 the nine second bus use acknowledge signals "AGR" ("IFRG", "DARG", "DAWGR", "CHRG", "CDRG", "BMRG", "PPRG", "PPWGR", "WARG", "EVRG" and "DSRG").

The slot counter 147 increments the value of the selection signal "SSEL[2:0]" every time the signal input from the OR gate 148 rises from "0" (false) to "1" (true) in order to output the selection signal "SSEL[2:0]" with which the multiplexer 141 sequentially and cyclically selects one of the priority level information numbers stored in the zeroth slot priority level register 200 to the seventh slot priority level register 207.

Accordingly, it is possible to detect the end of one or more bus cycles of the bus master, to which bus ownership is granted, on the basis of the logical OR of the nine second bus use acknowledge signals "AGR".

While the nine second bus use request signal "BURQ" is input to the OR gate 210, the second bus use request signal "SBR" is asserted if at least one of the nine second bus use request signal "BURQ" is "1".

The nine signals input to the multiplexer 143 correspond respectively to the nine second bus use request purposes, i.e., "instruction fetch", "data access", "character header", "character data", "bitmap data", "pixel plotter", "wave data", "envelope data" and "DMA source".

Accordingly, the multiplexer 143 receives, at its nine input terminals, the instruction fetch address "IFAD", the data access address "DAAD", the character header address "CHAD", the character data address "CDAD", the bitmap data address "BMAD", the pixel plotter address "PPAD", the wave data address "WAAD", the envelope data address "EVAD" and the DMA source address "DSAD".

The multiplexer 143 outputs an address signal, as a unified address "CADR[26:0]", corresponding to the second bus use request purpose (to which the bus ownership of the second bus 33 is to be granted) selected from among these nine input address signals by the bus master select signal "BMSEL". In this case, while the unified address "CADR[26:1]" is output to the state machine 155, the remaining least significant bit "CADR[0]" is output to the byte enable signal generation circuit 150. In addition, the unified address "CADR[22:21]" is output also to the address decoder 149.

The address decoder 149 decodes the unified address "CADR[22:21]" to generate a unified first area select signal "CASEL1" and a unified second area select signal "CASEL2" which are output to the multiplexers 151 to 153, the decoder 154 and the state machine 155.

This will be further explained below with reference to FIG. 6. As shown at the bottom of FIG. 6, the second bus zeroth area is designated when the address "A22" (the unified address "CADR[22]") is "0"; the second bus first area is designated when the address. "A22" (the unified address "CADR[22]") is "1" and the address "A21" (the unified address "CADR[21]") is "0"; and the second bus second area is designated when the address "A22" (the unified address "CADR[22]") is "1" and the address "A21" (the unified address "CADR[21]") is "1".

Accordingly, the address decoder 149 can determine which area is selected from among the second bus zeroth area, the second bus first area and the second bus second area by decoding the unified address "CAD R[22:21]".

Then, when the unified address CADR[22:21] designates the second bus zeroth area, the address decoder 149 negates both the unified first area select signal "CASEL1" and the unified second area select signal "CASEL2"; when the unified address CADR[22:21] designates the second bus first area, the address decoder 149 asserts the unified first area select signal "CASEL1" and negates the unified second area select signal "CASEL2"; and when the unified address CADR[22:21] designates the second bus second area, the address decoder 149 negates the unified first area select signal "CASEL1" and asserts the unified second area select signal "CASEL2".

Returning to FIG. 7, the multiplexer 151 selects one of the three bus width registers 160 to 162 in accordance with the unified first area select signal "CASEL1" and the unified second area select signal "CASEL2", and outputs the value of the selected bus width register to the state machine 155 as a unified bus width signal "CBW".

In other words, the multiplexer 151 outputs the value of the bus width register as the unified bus width signal "CBW" corresponding to the area which is one of the second bus zeroth area, the second bus first area and the second bus second area as designated by the unified address signal "CADR".

The multiplexer 152 selects one of the three random access cycle number registers 170 to 172 in accordance with the unified first area select signal "CASEL1" and the unified second area select signal "CASEL2", and outputs the value of the random access cycle number register as selected to the state machine 155 as a unified random access cycle number signal "CRCY".

In other words, the multiplexer 152 outputs, as the unified random access cycle number signal "CRCY", the value of the random access cycle number register corresponding to the area selected by the unified address signal "CADR" from among the second bus zeroth area, the second bus first area and the second bus second area.

The multiplexer 153 selects one of the three page access cycle number registers 180 to 182 in accordance, with the unified first area select signal "CASEL1" and the unified second area select signal "CASEL2", and outputs the value of the selected page access cycle number register to the state machine 155 as a unified page access cycle number signal "CPCY".

In other words, the multiplexer 153 outputs, as the unified page access cycle number signal "CPCY", the value of the page access cycle number register corresponding to the area selected by the unified address signal "CADR" from among the second bus zeroth area, the second bus first area and the second bus second area.

The decoder 154 selects one of the three page size registers 190 to 192 in accordance with the unified first area select signal "CASEL1" and the unified second area select signal "CASEL2", and decodes the value of the page size register as selected.

In other words, the decoder 154 decodes the value of the page size register corresponding to the area selected by the unified address signal. "CADR" from among the second bus zeroth area, the second bus first area and the second bus second area.

Then, the decoder 154 outputs the result of decoding to the state machine 155 as a unified page boundary signal "CPB". Each of the page size registers 190 to 192 is a 2-bit register capable of designating one of the page sizes of 0, 4, 8 and 16 bytes. The decoder 154 decodes this 2-bit signal and generates the unified page boundary signal "CPB[3:0]" serving as a mask of the external address "EAD[3:0]".

The multiplexer 144 is provided with nine input terminals corresponding to the nine second bus use request purposes, i.e., "instruction fetch", "data access", "character header", "character data", "bitmap data", "pixel plotter", "wave data", "envelope data", and "DMA source".

Accordingly, the multiplexer 144 receives, at the nine input terminals, the instruction fetch size signal "IFSZ", the data access size signal "DASZ" which is fixedly set to "1", the character header size signal "CHSZ", the character data size signal "CDSZ", the bitmap data size signal "BMSZ" which is fixedly set to "8", the pixel plotter size signal "PPSZ", the wave data size signal "WASZ" which is fixedly set to "1", the envelope data size signal "EVSZ" which is fixedly set to "1", and the DMA source size signal "DSSZ".

Namely, the data access size signal "DASZ", the wave data size signal "WASZ" and the envelope data size "EVSZ" as input are fixedly set to "1" respectively. This is because the data transmission size, which can be requested, is fixed to one byte for these respective second bus use request purposes as shown in FIG. 5. The "1" as input to the multiplexer 144 means that the data transmission size as requested is one byte. Also, the bitmap data size signal "BMSZ" as input is fixedly set to "8" (refer to FIG. 5).

The multiplexer 144 outputs to the state machine 155 a size signal, as a unified size signal "CSZ", corresponding to the second bus use request purpose (to which the bus ownership of the second bus 33 is to be granted) selected from among these nine input size signals by the bus master select signal "BMSEL".

The multiplexer 145 is provided with nine input terminals corresponding to the nine second bus use request purposes, i.e., "instruction fetch", "data access", "character header", "character data", "bitmap data", "pixel plotter", "wave data", "envelope data", and "DMA source".

Accordingly, the multiplexer 145 receives, at the nine input terminals, a value of "10" corresponding to the second bus use request purpose of "instruction fetch", the data access write data "DAWD", a value of "0" corresponding to the second bus use request purpose of "character header", a value of "0" corresponding to the second bus use request purpose of "character data", a value of "0" corresponding to the second bus use request purpose of "bitmap data", the pixel plotter write data "PPWD", a value of "0" corresponding to the second bus use request purpose of "wave data", a value of "0" corresponding to the second bus use request purpose of "envelope data", and a value of "0" corresponding to the second bus use request purpose of "DMA source".

In this case, the input value of "0" means that there is no data to be written. This is because write operation is not performed for these second bus use request purposes, i.e., "instruction fetch", "character header", "character data", "bitmap data", "wave data", "envelope data" and "DMA source".

The multiplexer 145 outputs to the state machine 155 input data, as a unified write data "CWD", corresponding to the second bus use request purpose (to which the bus ownership of the second bus 33 is to be granted) selected from among these nine input values by the bus master select signal "BMSEL".

The multiplexer 146 is provided with nine input terminals corresponding to the nine second bus use request purposes, i.e., "instruction fetch", "data access", "character header", "character data", "bitmap data", "pixel plotter", "wave data", "envelope data", and "DMA source".

Accordingly, the multiplexer 146 receives, at the nine input terminals, a value of "0" corresponding to the second bus use request purpose of "instruction fetch", the data access write request signal "DAWRQ", a value of "0" corresponding to the second bus use request purpose of "character header", a value of "0" corresponding to the second bus use request purpose of "character data", a value of "0" corresponding to the second bus use request purpose of "bitmap data", the pixel plotter write request signal "PPWRQ", a value of "0" corresponding to the second bus use request purpose of "wave data", a value of "0" corresponding to the second bus use request purpose of "envelope data", and a value of "0" corresponding to the second bus use request purpose of "DMA source".

In this case, the input value of "0" means that there is no write request. This is because write operation is not performed for these second bus use request purposes, i.e., "instruction fetch", "character header", "character data", "bitmap data", "wave data", "envelope data" and "DMA source".

The multiplexer 145 outputs to the state machine 155 an input signal, as a unified write request signal "CWRQ", corresponding to the second bus use request purpose (to which the bus ownership of the second bus 33 is to be granted) selected from among these nine input signals by the bus master select signal "BMSEL".

The byte enable signal generation circuit 150 generates a unified lower byte enable signal "CLWBE" and a unified upper byte enable signal "CUPBE" in accordance with the unified address "CADR[0]", the unified bus width signal "CBW" and the unified write request signal "CWRQ", and outputs them to the state machine 155. More specific description is as follows.

At first, the explanation will be given in the case where the unified write request signal "CWRQ" is "0" (read operation). When the unified bus width signal "CBW" designates a data bus width of 16 bits, the byte enable signal generation circuit 150 asserts the unified lower byte enable signal "CLWBE" and the unified upper byte enable signal "CUPBE" irrespective of the value of the unified address "CADR[0]".

On the other hand, when the unified bus width signal "CBW" designates a data bus width of 8 bits, the byte enable signal generation circuit 150 asserts the unified lower byte enable signal "CLWBE" and negates the unified upper byte enable signal "CUPBE" in the case where the unified address "CADR[0]" is "0", and negates the unified lower byte enable signal "CLWBE" and asserts the unified upper byte enable signal "CUPBE" in the case where the unified address "CADR[0]" is "1".

As has been discussed above, the read operation is performed in units of 16 bits in the area where the bus width is set to 16 bits, and performed in units of 8 bits in the area where the bus width is set to 8 bits.

Next, the explanation will be given in the case where the unified write request signal "CWRQ" is "1" (write operation). Irrespective of the value of the unified bus width signal "CBW", the byte enable signal generation circuit 150 asserts the unified lower byte enable signal "CLWBE" and negates the unified upper byte enable signal "CUPBE" in the case where the unified address "CADR[0]" is "0", and negates the unified, lower byte enable signal "CLWBE" and asserts the unified upper byte enable signal "CUPBE" in the case where the unified address "CADR[0]" is "1".

As has been discussed above, the write operation is performed always in units of 8 bits in both the area where the bus width is set to 16 bits and the area where the bus width is set to 8 bits.

The state machine 155 defines a plurality of states "IDLE", "FREE", "WRITE", "READ" and "STEAL" with regard to the access to the second bus 33, controls the external address "EAD", the external address output enable signal "EADOE", the external data output "EDAO", the external data output enable signal "EDAOE", the external read enable signal "ERDE", the external write enable signal "EWRE", the lower byte enable signal "LWBE", the upper byte enable signal "UPBE", the first area select signal "ASSEL1" and the second area select signal "ASSEL2", and also controls the instruction fetch upper byte read acknowledge signal "IFURG", the instruction fetch lower byte read acknowledge signal "IFLRG", the data access lower byte read acknowledge signal "DALRG", the data access upper byte read acknowledge signal "DAURG", the data access write acknowledge signal "DAWGR", the character header lower byte read acknowledge signal "CHLRG", the character header upper byte read acknowledge signal "CHURG", the character data lower byte read acknowledge signal "CDLRG", the character data upper byte read acknowledge signal "CDURG", the bitmap data lower byte read acknowledge signal "BMLRG", the bitmap data upper byte read acknowledge signal "BMURG", the pixel plotter lower byte read acknowledge signal "PPLRG", the pixel plotter upper byte read acknowledge signal "PPURG", the pixel plotter write acknowledge signal "PPWGR", the wave data lower byte read acknowledge signal "WALRG", the wave data upper byte read acknowledge signal "WAURG", the envelope data lower byte read acknowledge signal "EVLRG", the envelope data upper byte read acknowledge signal "EVURG", the DMA source lower byte read acknowledge signal "DSLRG", the DMA source upper byte read acknowledge signal "DSURG", the instruction fetch read acknowledge signal "IFRG", the data access read acknowledge signal "DARG", the character header read acknowledge signal "CHRG", the character data read acknowledge signal "CDRG", the bitmap data read acknowledge signal "BMRG", the pixel plotter read acknowledge signal "PPRG", the wave data read acknowledge signal "WARG", the envelope data read acknowledge signal "EVRG", and the DMA source read acknowledge signal "DSRG".

Figure 8:
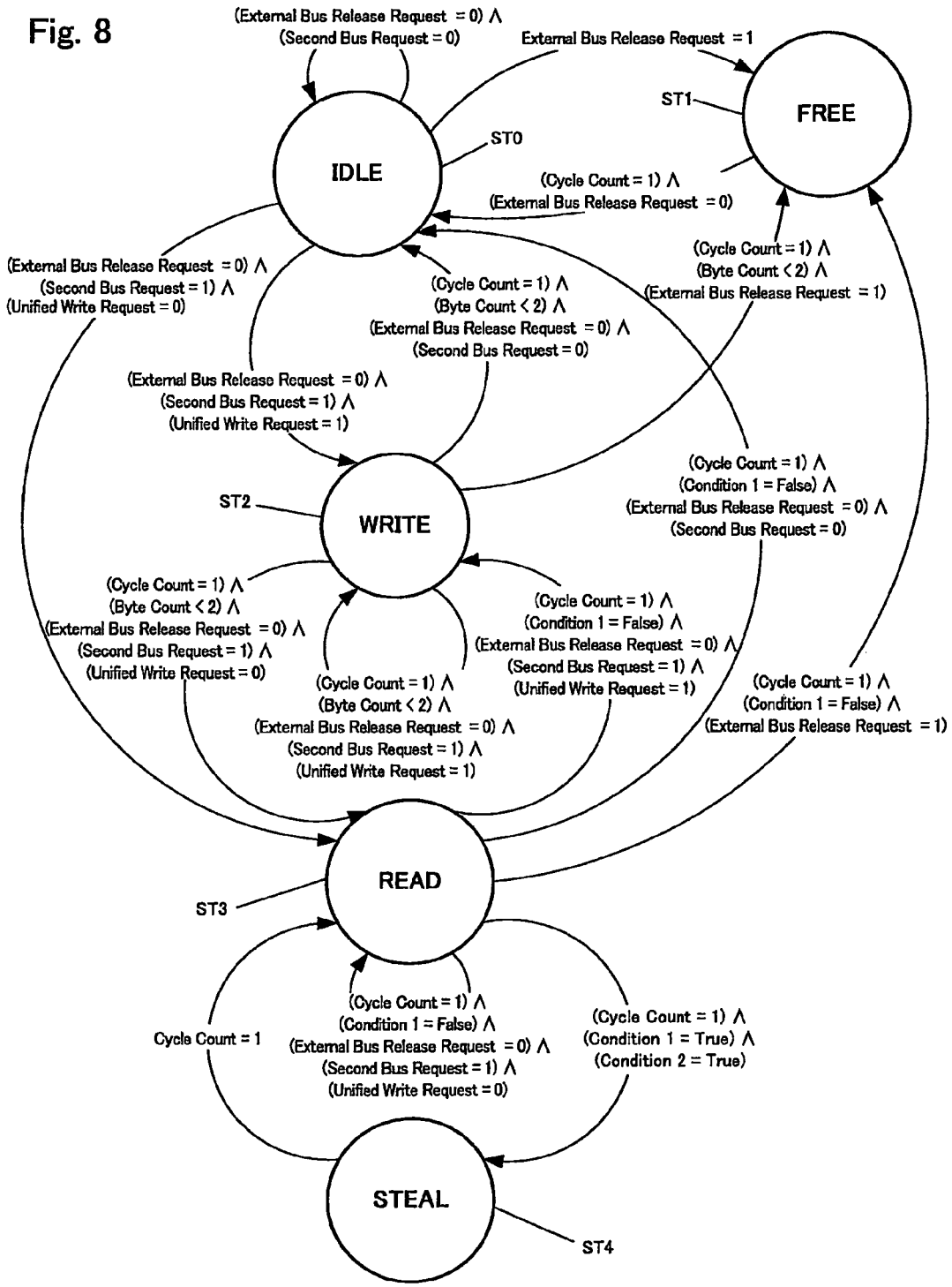
FIG. 8 is a view for explaining the state transition of the state machine in accordance with the embodiment of the present invention shown in FIG. 7.

FIG. 8 is a view for explaining the state transition of the state machine 155 shown in FIG. 7. As shown in FIG. 8, the "IDLE" state ST0 is a state in which there is no use request for the second bus 33. In the "FREE" state ST1, the state machine 155 accepts a request for releasing the external bus 43 from the CPU 1 (the external bus release request register 156 is set to "1") and puts the external address "EAD", the external data output "EDAO", the external read enable signal "ERDE", the external write enable signal "EWRE", the lower byte enable signal "LWBE", the upper byte enable signal "UPBE", the first area select signal "ASSEL1" and the second area select signal "ASSEL2" respectively in an Hi-Z (high impedance) state.

The "WRITE" state ST2 is taken for write cycles. The write cycle can be repeatedly performed for writing multiple bytes.

The "READ" state ST3 is taken for read cycles. The read cycle can be repeatedly performed for reading multiple bytes. However, if the sound processor 7 issues a read request after a multiple byte read operation is accepted, the state machine 155 changes its state to the "STEAL" state ST4 such that the multiple byte read operation is interrupted by the sound processor 7 for its read operation.

The "STEAL" state ST4 is provided for permitting the interrupt by the sound processor 7 during the read operation by another bus master, because the bus use request issued by the sound processor 7 assumes an overriding urgency.

With reference to the figure, the state transition will be explained. Meanwhile, in the figure, the symbol "^" means a logical AND; "V" means a logical OR; "<" is a less than sign; "≧" is a greater than/equal sign; and "=" is an equal sign.

In the case of the present invention, if a conditional expression in the figure is satisfied, the state transition corresponding to the satisfied conditional expression takes place on the subsequent rising edge of the internal clock signal "ICLK".

At first, the state transition from the "IDLE" state ST0 will be explained.

When the external bus release request register 156 takes a value of "1", then the state machine 155 changes its state to the "FREE" state ST1.

On the other hand, when the external bus release request register 156 takes a value of "0", when the second bus use request signal "SBR" takes a value of "1" and when the unified write request signal "CWRQ" takes a value of "1", then the state machine 155 changes its state to the "WRITE" state ST2.

Furthermore, when the external bus release request register 156 takes a value of "0", when the second bus use request signal "SBR" takes a value of "1" and when the unified write request signal "CWRQ" takes a value of "0", then the state machine 155 changes its state to the "READ" state ST3. Incidentally, it means a read request if the second bus use request signal "SBR" takes a value of "1" and the unified write request signal "CWRQ" takes a value of "0".

On the other hand, when the external bus release request register 156 takes a value of "0" and when the second bus use request signal "SBR" takes a value of "0", then the state machine 155 changes its state to the same "IDLE" state ST0.

Next, the state transition from the "FREE" state ST1 will be explained.

When a cycle count "CYC" of a cycle counter is "1" and the external bus release request register 156 takes a value of "0", then the state machine 155 changes its state to the "IDLE" state ST0.

In this case, the cycle counter is a 3-bit counter. The initial value of the cycle count "CYC" in the "FREE" state ST1 is "0", i.e., "0b000" which is decremented by one for every one cycle of the internal clock signal "ICLK". "0b000" as the initial value of the cycle counter "CYC" means 8 cycles of the internal clock signal "ICLK".

Next, the transition from the "WRITE" state ST2 will be explained.

When the cycle count "CYC" takes a value of "1", when a byte count "BYC" takes a value smaller than "2", when the external bus release request register 156 takes a value of "0", and when the second bus use request signal "SBR" takes a value of "0", then the state machine 155 changes its state to the "IDLE" state ST0.

In this case, the initial value of the cycle count "CYC" in the "WRITE" state ST2 is the random access cycle number corresponding to the unified random access cycle number signal "CRCY". Also, the initial value of the byte count "BYC" in the "WRITE" state ST2 (refer to FIG. 5) is the size corresponding to the unified size signal "CSZ" which is decremented by one every time a 1-byte write operation is completed.

Furthermore, when the cycle count "CYC" takes a value of "1", when the byte count "BYC" is smaller than "2", and when the external bus release request register 156 takes a value of "1", the state machine 155 changes its state to the "FREE" state ST1.

Still further, when the cycle count "CYC" takes a value of "1", when the byte count "BYC" is smaller than "2", when the external bus release request register 156 takes a value of "0", when the second bus use request signal "SBR" takes a value of "1", and when the unified write request signal "CWRQ" takes a value of "1", then the state machine 155 changes its state to the same "WRITE" state ST2.

Still further, when the cycle count "CYC" takes a value of "1", when the byte count "BYC" is smaller than "2", when the external bus release request register 156 takes a value of "0", when the second bus use request signal "SBR" takes a value of "1", and when the unified write request signal "CWRQ" takes a value of "0", then the state machine 155 changes its state to the "READ" state ST3.

Next, the state transition from the "READ" state ST3 will be explained.

When the cycle count "CYC" takes a value of "1", when the condition 1 as described in FIG. 8 is false, when the external bus release request register 156 takes a value of "0", and when the second bus use request signal "SBR" takes a value of "0", then the state machine 155 changes its state to the "IDLE" state ST0.

In this case, the initial value of the cycle count "CYC" in the "READ" state ST3 is the random access cycle number corresponding to the unified random access cycle number signal "CRCY" or the page access cycle number corresponding to the unified page access cycle number signal "CPCY".

The condition 1 is the logical OR of the following three Boolean expressions corresponding to the condition that that the second bus width signal "SBW" takes a value of "1", that the external address "EAD[0]" takes a value of "0" and that the byte count "BYC" is no smaller than 3, the condition that the second bus width signal "SBW" takes a value of "1", that the external address "EAD[0]" takes a value of "1" and that the byte count "BYC" is no smaller than 2, and the condition that the second bus width signal "SBW" takes a value of "10" and that the byte count "BYC" is no smaller than 2.

When the second bus width signal "SBW" takes a value of "10" the bus width as required is 8 bits, and when the second bus width signal "SBW" takes a value of "1" the bus width as required is 16 bits. On the other hand, the initial value of the byte count "BYC" in the "READ" state ST3 is the size corresponding to the unified size signal "CSZ" (refer to FIG. 5), while the byte count "BYC" is decremented by one every time one byte read operation is completed. Also, when the external address "EAD[0]" takes a value of "0" the lower byte of a 16-bit data is designated, and when the external address "EAD[0]" takes a value of "1" the upper byte of a 16-bit data is designated.

Accordingly, if the condition 1 is true, it is meant that when the bus width as required is 16 bits, since there are three or more remaining bytes to be read including the lower byte which is designated by the current external address "EAD[0]", all the remaining bytes cannot be read by one bus cycle, that when the bus width as required is 16 bits, since there are two or more remaining bytes to be read including the upper byte which is designated by the current external address "EAD[0]", all the remaining bytes cannot be read by one bus cycle, or that when the bus width as required is 8 bits, since there are two or more remaining bytes to be read, all the remaining bytes cannot be read by one bus cycle.

Conversely, if the condition 1 is false, it is meant that when the bus width as required is 16 bits, since there are not more than two remaining bytes to be read including the lower byte which is designated by the current external address "EAD[0]", all the remaining bytes can be read by one bus cycle, that when the bus width as required is 16 bits, since there, is only one remaining byte to be read, i.e., the upper byte which is designated by the current external address "EAD[0]", the remaining byte can be read together by one bus cycle, or that when the bus width as required is 8 bits, since there is only one byte to be read, this byte can be read by one bus cycle.

By the way, when the cycle count "CYC" takes a value of "1", when the condition 1 is false, and when the external bus release request register 156 takes a value of "1", then the state machine 155 changes its state to the "FREE" state ST1.

On the other hand, when the cycle count "CYC" takes a value of "1", when the condition 1 is false, when the external bus release request register 156 takes a value of "0", when the second bus use request signal "SBR" takes a value of "1", and when the unified write request signal "CWRQ" takes a value of "1", then the state machine 155 changes its state to the "WRITE" state ST2.

Furthermore, when the cycle count "CYC" takes a value of "1", when the condition 1 is false, when the external bus release request register 156 takes a value of "0", when the second bus use request signal "SBR" takes a value of "1", and when the unified write request signal "CWRQ" takes a value of "0", then the state machine 155 changes its state to the same the "READ" state ST3.

Still further, when the cycle count "CYC" takes a value of "1", when the condition 1 is true, and when the condition 2 also described in FIG. 8 is true, the state machine 155 changes its state to the "STEAL" state ST4.

In this case, the condition 2 is a condition that is true when the wave data bus use request signal "WABR" takes a value of "1" or when the envelope data bus use request signal "EVBR" takes a value of "1".

Accordingly, even during the read operation by a bus master other than the sound processor 7, when the sound processor 7 outputs a wave data bus use request signal "WABR" or an envelope data bus use request signal "EVBR", the state machine 155 changes its state to the "STEAL" state ST4 such that the read operation is interrupted by the sound processor 7 for its read operation if the cycle count "CYC" takes a value of "1". However, the state transition to the "STEAL" state ST4 requires the condition 1 to be true, and therefore it is required that all the remaining read data cannot be read in one bus cycle. In other words, if the condition 1 is false, i.e., if all the remaining read data can be read in one bus cycle, the "READ" state ST3 is maintained in order to finish the read operation by the bus master.

Next, the state transition from the "STEAL" state ST4 will be explained.

When the cycle count "CYC" takes a value of "1", the state machine 155 changes its state to the "READ" state ST3.

Next, the state transition as illustrated in FIG. 8 will be explained in detail on the basis of the description of the state machine 155 by the use of an HDL (hardware description language). In this case, the following conditions are assumed. The logic reflects changes on the subsequent rising edge of the internal clock signal "ICLK" as described above. The logic is described basically in positive logic. However, the unified lower byte enable signal "CLWBE", the unified upper byte enable signal "CUPBE", the upper byte enable signal "UPBE", and the lower byte enable signal "LWBE" are negative logic.

Also, while the symbol "=" means an equal sign in conditional statements, the same symbol means assignment in other statements.

Furthermore, the following description includes a write acknowledge signal "WRAC", a write data latch value "WDSV", a random access cycle number latch value "RACSV", an external address latch value "EADSV", a first area select signal latch value "FSSV", a second area select signal latch value "SSSV", the second bus width signal "SBW", a second bus width latch value "SBWSV", a read acknowledge signal "REGR", a read acknowledge latch value "REGRSV", a page access cycle number latch value "PACSV", a lower byte read acknowledge signal "LWRG", and an upper byte read acknowledge signal "UPRG", which are not illustrated in FIG. 7 because these signals are internal signals of the state machine 155.

["IDLE" State ST0]

The state machine 155 operates in order that the external address output enable signal "EADOE"=1, that the external data output enable signal "EDAOE"=0 (that is, the second data bus of the second bus 33 is put in an Hi-Z state), that the external write enable signal "EWRE"=0 and that the external read enable signal "ERDE"=0.

If the external bus release request register 156=1, the "FREE" common logic to be described below is executed; else if the second bus use request signal "SBR"=1, the "ACCESS" common logic to be described below is executed; or else the "IDLE" common logic to be described below is executed.

["FREE" State ST1]

(1) <In the case where the cycle count "CYC"≠1>

The cycle count "CYC" is decremented by one.

(2) <In the case where it is not true cycle count "CYC"≠1, i.e., the cycle count "CYC"=1>

The state machine 155 operates in order that the external address output enable signal "EADOE"=0.

If the external bus release request register 156=0, the state machine 155 operates in order that the external address output enable "EADOE"=1 and changes its state to the "IDLE" state ST0.

["WRITE" State ST2]

(1) <In the case where the cycle count "CYC"≠1>

(1-1) The state machine 155 operates in order that the write acknowledge signal "WRAC[8:0]"=0b000000000, that the external write enable signal "EWRE"=1, and that the external data output enable signal "EDAOE"=1. Incidentally, the right acknowledge signal "WRAC[8:0]" is negated because the data write operation to the external memory 45 has not been completed yet in a halfway bus cycle.

(1-2) If the external address "EAD[0]"=1, the state machine 155 operates in order that the external data "EDAO[15:8]"=the write data latch value "WDSV[15:8]" and the external data "EDAO[7:0]"=the write data latch value "WDSV[15:8]". Because the write operation to the external memory 45 is performed in units of bytes, the external data "EDAO[15:8]" is written in the case where the data bus width is 16 bits, and the external data "EDAO[7:0]" is written in the case where the data bus width is 8 bits.

On the other hand, in the case where it is not true that the external address "EAD[0]"=1, i.e., the external address "EAD[0]"=0, the state machine 155 operates in order that the external data "EDAO[15:0]"=the write data latch value "WDSV[15:0]". Because the write operation is performed in units of bytes, the external data "EDAO[7:0]" is written to the external memory 45.

(1-3) The cycle count "CYC" is decremented by one.

(2) <In the case where it is not true that the cycle count "CYC"{fourth root}1, i.e., the cycle count "CYC"=1 and where the byte count "BYC"≧2>

The state machine 155 operates in order that the write acknowledge signal "WRAC[8:0]"=0b000000000, that the external write enable signal "EWRE"=0, that the external data output enable signal "EDAOE"=0, that the cycle count "CYC"=the random access cycle number latch value "RACSV", that the external address "EAD[26:0]"=the external address "EAD[26:0]+1", and that the upper byte enable signal "UPBE"=the logical inversion of the external address "EAD[0]". Meanwhile, the byte count "BYC" is decremented by one. Incidentally, the right acknowledge signal "WRAC[8:0]" is negated because there is remaining data to be written.

(3) <In the case where it is not true that the cycle count "CYC"≠1, i.e., the cycle count "CYC"=1 and where it is not true that the byte count "BYC"≧2, i.e., the byte count "BYC"=1>

The state machine 155 operates in order that the external write enable signal "EWRE"=0, and that the external data output enable signal "EDAOE"=0. If the external bus release request register 156=1, the "FREE" common logic to be described below is executed; else if the second bus use request signal "SBR"=1, the "ACCESS" common logic to be described below is executed; or else the "IDLE" common logic to be described below is executed.

["READ" State ST3]

(1) The state machine 155 operates in order that the external write enable signal "EWRE"=0, and that the external data output enable signal "EDAOE"=0.

(2) <In the case where the cycle count "CYC"≠1>

The state machine 155 operates in order that the cycle count "CYC" is decremented by one and that the external read enable signal "ERDE"=1.

(3) <In the case where it is not true that the cycle count "CYC"≠1, i.e., the cycle count "CYC"=1 and the condition 1 of FIG. 8 is true>

(3-1) <In the case where the condition 2 of FIG. 8 is true>

(3-1-1) The state machine 155 operates in order that the external read enable signal "ERDE"=0.

(3-1-2) If the second bus width signal "SBW"=1 and the external address "EAD[0]"=0 and byte count "BYC"≧3, then the state machine 155 operates in order that the byte count "BYC" is decremented by two and the external address latch value "EADSV[26:0]"=the external address "EAD[26:0]+2". On the other hand, in the other cases as already mentioned, if the byte count "BYC"≧2, the state machine 155 operates in order that the byte count "BYC" is decremented by one and that the external address latch value "EADSV[26:0]"=the external address "EAD[26:0]+1".

(3-1-3) The state machine 155 operates in order that the external address "EAD[26:1]"=the unified address "CADR[26:1]", that the external address "EAD[0]"=the unified lower byte enable signal "CLWBE", that the first area select signal "ASSEL1"=the unified first area select signal "CASEL1", that the second area select signal "ASSEL2"=the unified second area select signal "CASEL2", that the second bus width latch value "SBWSV"=the second bus width signal "SBW", that the second bus width signal "SBW"=the unified bus width signal "CBW", that the upper byte enable signal "UPBE"=the unified upper byte enable signal "CUPBE", that the cycle count "CYC"=the unified random access cycle number signal "CRCY", that the read acknowledge latch value "REGRSV"=the read acknowledge signal "REGR", that the read acknowledge signal "REGR"=the bus master select signal "BMSEL", and that the state is changed to the "STEAL" state ST4.

(3-2) <In the case where the condition 2 of FIG. 8 is false>

(3-2-1) The state machine 155 operates in order that the first area select signal "ASSEL1"=the first area select latch value "FSSV", and that the second area select signal "ASSEL2"=the second area select latch value "SSSV".

(3-2-2) If the second bus width signal "SBW"=1, if the external address "EAD[0]"=0 and if the byte count "BYC"≧3, then the state machine 155 operates in order that the byte count "BYC" is decremented by two and that the external address "EAD[26:0]"=the external address "EAD[26:0]+2". On the other hand, in the cases other than mentioned, if the byte count "BYC"≧2, the state machine 155 operates in order that the byte count "BYC" is decremented by one and that the external address "EAD[26:0]"=the external address "EAD[26:0]+1".

(3-2-3) In the case where the second bus width signal "SBW"=1, the state machine 155 operates in order that the upper byte enable signal "UPBE"=0, and otherwise, i.e., in the case where the second bus width signal "SBW"=0, the state machine 155 operates in order that the upper byte enable signal "UPBE"=the logical inversion of the external address "EAD[0]".

(3-2-4) <In the case where the second bus width signal "SBW"=1>

If the logical OR of the respective bits of the external address "EAD[3:1]" and the respective bits of the unified page boundary signal "CPB[3:1]" is not "0b111", the state machine 155 operates in order that the cycle count "CYC"=the unified page access cycle number signal "CPCY" and that the external read enable signal "ERDE"=1. On the other hand, if the logical OR of the respective bits of the external address "EAD[3:1]" and the respective bits of the unified page boundary signal "CPB[3:1]" is "0b111", the state machine 155 operates in order that the cycle count "CYC"=the random access cycle number latch value "RACSV" and that the external read enable signal "ERDE"=0. This will be explained in detail below.

In the case of the present embodiment, for example, the decoder 154 outputs, as the page boundary signal "CPB", "0b1111" for a page size of 0 byte, "0b1100" for a page size of 4 bytes, "0b1000" for a page size of 8 bytes, and "0b0000" for a page size of 16 bytes.

In this case, the second bus width signal "SBW"=1 which means the data bus width of the second bus 33 is 16 bits, that is, one word of the external memory 45 consists in 16 bits. In such a case, when the external address "EAD" is updated to designate the next word, the external address "EAD[0]" is not changed with a value of "0" while the external address "EAD[26:1]" is incremented by one.

With this fact in mind, it is assumed for explanation that "0b1100" (indicative of 4 bytes) is assigned to the page boundary signal "CPB[3:0]". In this case, because the page size is 4 bytes, there are different external addresses "EAD[3:1]" in the same page, for example, "0b000" and "0b001". In other words, in the case where one page consists in 4 bytes, the external address "EAD[1]" is incremented within the same page as "0b0"→"0b1".

Accordingly, the external address "EAD[1]" indicates "0b1" to point to the last word of a 4 byte page. Therefore, the logical OR of the respective bits of the page boundary signal "CPB[3:1]" (0b110) and the respective bits of the external address "EAD[3:1]" (0b**1) pointing to the last word in the page is necessarily "0b111". In this manner, it is judged whether or not the word pointed to by the external address "EAD" is the last word of a page. Incidentally, "*" is used to be replaced by an arbitrary binary value.

(3-2-5) <In the case where the second bus width signal "SBW"=0> If the logical OR of the respective bits of the external address "EAD[3:0]" and the respective bits of the unified page boundary signal "CPB[3:0]" is not "0b1111", the state machine 155 operates in order that the cycle count "CYC"=the unified page access cycle number signal "CPCY" and that the external read enable signal "ERDE"=1. On the other hand, if the logical OR of the respective bits of the external address "EAD[3:0]" and the respective bits of the unified page boundary signal "CPB[3:0]" is "0b1111", the state machine 155 operates in order that the cycle count "CYC"=the random access cycle number latch value "RACSV" and that the external read enable signal "ERDE"=0. This point will be explained in detail below.

In this case, the second bus width signal "SBW"=0 which means the data bus width of the second bus 33 is 8 bits, that is, one word of the external memory 45 consists in 8 bits. In such a case, when the external address "EAD" is updated to designate the next word, the external address "EAD[26:0]" is incremented by one.

With this fact in mind, it is assumed for explanation that "0b100" (indicative of 4 bytes) is assigned to the page boundary signal "CPB[3:0]". In this case, because the page size is 4 bytes, there are different external addresses "EAD[3:0]" in the same page, for example, "0b0000", "0b0001", "0b0010" and "0b0011". In other words, in the case where one page consists in 4 bytes, the external address "EAD[1:0]" is incremented within the same page as "0b00"→"0b01"→"0b10"→"0b11".

Accordingly, the external address "EAD[1:0]" indicates "0b11" to point to the last word of a 4 byte page. Therefore, the logical OR of the respective bits of the page boundary signal "CPB[3:0]" (0b1100) and the respective bits of the external address EAD[3:0] (0b**11) pointing to the last word in the page is necessarily "0b1111". In this manner, it is judged whether or not the word pointed to by the external address "EAD" is the last word of a page. Incidentally, "*" is used to be replaced by an arbitrary binary value.

(4) <In the case where it is not true that the cycle count "CYC"≠1 in the "READ" state ST3, i.e., the cycle count "CYC"=1 and the condition 1 of FIG. 8 is false>

The state machine 155 operates in order that the external read enable "ERDE"=0. If the external bus release request register 156=1, the "FREE" common logic to be described below is executed; else if the second bus use request signal "SBR"=1, the "ACCESS" common logic to be described below is executed; or else the "IDLE" common logic to be described below is executed.

["STEAL" State ST4]

(1) <In the case where the cycle count "CYC"≠1> The state machine 155 operates in order that the external read enable signal "ERDE"=1 and that the cycle count "CYC" is decremented by one.

(2) <In the case where it is not true that the cycle count "CYC"≠1, i.e., the cycle count "CYC"=1>

(2-1) The state machine 155 operates in order that the external read enable signal "ERDE"=0, that the external address "EAD[26:0]"=the external address latch value "EADSV[26:0]", that the first area select signal "ASSEL1"=the first area select signal latch value "FSSV", that the second area select signal "ASSEL2"=the second area select signal latch value "SSSV", and that the second bus width signal "SBW"=the second bus width latch value "SBWSV".

(2-2) If the second bus width latch value "SBWSV"=1, the state machine 155 operates in order that the upper byte enable signal "UPBE"=0, otherwise (i.e., if the second bus width latch value "SBWSV"=0) the state machine 155 operates in order that the upper byte enable signal "UPBE"=the logical inversion of the external address latch value "EADSV[0]".

(2-3) The state machine 155 operates in order that the cycle count "CYC"=the random access cycle number latch value "RACSV[2:0]", that the read acknowledge signal "REGR[8:0]"=the read acknowledge latch value "REGRSV[8:0]", and that the state is changed to the "READ" state ST3.

["IDLE" Common Logic]

The state machine 155 operates in order that the read acknowledge signal "REGR[8:0]"=0, and that the state is changed to the "IDLE" state ST0.

["FREE" Common Logic]

The state machine 155 operates in order that the external address "EAD[26:0]"=0x4000000, that the upper byte enable signal "UPBE"=1, that the first area select signal "ASSEL1"=0, that the second area select signal "ASSEL2"=0, that the cycle count "CYC"=0, and that the state is changed to the "FREE" state ST1.

In this case, "0x4000000" is the address which is not accessed for neither read nor write operations. In this case, the cycle count "CYC" is "0" which means one bus cycle is an 8-clock cycle. Incidentally, the lower byte enable signal "LWBE" is controlled in the same manner as the external address "EAD[0]".

["ACCESS" Common Logic]

(1) The state machine 155 operates in order that the second bus width signal "SBW"=the unified bus width signal "CBW", the external address "EAD[26:1]"=the unified address "CADR[26:1]", that the external address "EAD[0]"=the unified lower byte enable signal "CLWBE", that the upper byte enable signal "UPBE"=the unified upper byte enable signal "CUPBE", that the first area select signal "ASSEL1"=the unified first area select signal "CASEL1", that the first area select latch value "FSSV"=the unified first area select signal "CASEL1", that the second area select signal "ASSEL2"=the unified second area select signal "CASEL2", that the second area select latch value "SSSV"=the unified second area select signal "CASEL2", that the cycle count "CYC"=the unified random access cycle number signal "CRCY", that the random access cycle number latch value "RACSV"=the unified random access cycle number signal "CRCY", that page access cycle number latch value "PACSV"=the unified page access cycle number signal "CPCY" and the byte count "BYC"=the unified size signal "CSZ".

(2) <In the case where the unified write request signal "CWRQ"=1>

The state machine 155 operates in order that the write acknowledge signal "WRAC[8:0]"=the bus master select signal "BMSEL[8:0]", that the read acknowledge signal "REGR[8:0]"=0b000000000, that the write data latch value "WDSV[15:0]"=the unified write data "CWD[15:0]", and that the state is changed to the "WRITE" state ST2.

(3) <In the case where it is not true that the unified write request signal "CWRQ"=1, i.e., the unified write request signal "CWRQ"=0>

The state machine 155 operates in order that the read acknowledge signal "REGR[8:0]"=the bus master select signal "BMSEL[8:0]" and that the state is changed to the "READ" state ST3.

[Read Acknowledge Signal Generation Logic]

(1) <In the case where cycle count "CYC"=1>

(1-1) <In the case where the second bus width signal "SBW"=1 (indicative of 16-bit bus width)>

The state machine 155 operates in order that the lower byte read acknowledge signal "LWRG[8:0]"=the read acknowledge signal "REGR[8:0]", and that the upper byte read acknowledge signal "UPRG[8:0]"=the read acknowledge signal "REGR[8:0]".

(1-2) <In the case where it is not true that the second bus width signal "SBW"=1, i.e., the second bus width signal "SBW"=0 (indicative of 8-bit bus width)>

If the external address "EAD[0]"=0, the state machine 155 operates in order that the lower byte read acknowledge signal "LWRG[8:0]"=the read acknowledge signal "REGR[8:0]", and that the upper byte read acknowledge signal "UPRG[8:0]"=0b000000000.

If it is not true that the external address "EAD[0]"=0, i.e., the external address "EAD[0]"=1, the state machine 155 operates in order that the lower byte read acknowledge signal "LWRG[8:0]"=0b000000000, and that the upper byte read acknowledge signal "UPRG[8:0]"=the read acknowledge signal "REGR[8:0]".

(2) <In the case where it is not true that cycle count "CYC"=1>

The state machine 155 operates in order that the lower byte read acknowledge signal "LWRG[8:0]"=0b000000000, and that the upper byte read acknowledge signal "UPRG[8:0]"=0b000000000.

(3) The state machine 155 operates in order that the read acknowledge signals "REGR[0]" to "REGR[8]" are, respectively, the wave data read acknowledge signal "WARG", the envelope data read acknowledge signal "EVRG", the bitmap data read acknowledge signal "BMRG", the character data read acknowledge signal "CDRG", the character header read acknowledge signal "CHRG", the pixel plotter read acknowledge signal "PPRG", the DMA source read acknowledge signal "DSRG", the data access read acknowledge signal "DARG" and the instruction fetch read acknowledge signal "IFRG".

(4) The state machine 155 operates in order that the lower byte read acknowledge signal "LWRG[0]" to "LWRG[8]" are, respectively, the wave data lower byte read acknowledge signal "WALRG", the envelope data lower byte read acknowledge signal "EVLRG", the bitmap data lower byte read acknowledge signal "BMLRG", the character data lower byte read acknowledge signal "CDLRG", the character header lower byte read acknowledge signal "CHLRG", the pixel plotter lower byte read acknowledge signal "PPLRG", the DMA source lower byte read acknowledge signal "DSLRG", the data access lower byte read acknowledge signal "DALRG" and the instruction fetch lower-byte read acknowledge signal "IFLRG".

(5) The state machine 155 operates in order that the upper byte read acknowledge signals "UPRG[0]" to "UPRG[8]" are, respectively, the wave data upper byte read acknowledge signal "WAURG", the envelope data upper byte read acknowledge signal "EVURG", the bitmap data upper byte read acknowledge signal "BMURG", the character data upper byte read acknowledge signal "CDURG", the character header upper byte read acknowledge signal "CHURG", the pixel plotter upper byte read acknowledge signal "PPURG", the DMA source upper byte read acknowledge signal "DSURG", the data access upper byte read acknowledge signal "DAURG" and the instruction fetch upper byte read acknowledge signal "IFURG".

[Write Acknowledge Signal Generation Logic]

The state machine 155 operates in order that the write acknowledge signal "WRAC[5]" is the pixel plotter write acknowledge signal "PPWGR" and that the write acknowledge "WRAC[7]" is the data access write acknowledge signal "DAWGR".

As has been discussed above, in accordance with the present embodiment, a bus master is permitted to use the bus for the bus cycles corresponding to the size (refer to FIG. 5) as requested by the bus master, and therefore the bus master can successively read or write data. Since the respective bus masters are permitted to successively use the bus in this manner and, at the same time, arbitration is always performed once for every series of the bus cycles corresponding to the requested size, it is possible to increase the rate of operating the bus and decrease the latency responsive to the bus use request from a bus master as short as possible.

In addition to this, since the size signal "IFSZ", "CHSZ", "CDSZ", "PPSZ" or "DSSZ" indicative of the data size of a read or write operation is issued by a bus master as a size signal indicative of the necessary and sufficient size for data transmission so that the state machine 155 can set an optimal number of bus cycles. Accordingly, in this case, it is possible to further improve the rate of operating the bus and further shorten the latency of the response to a bus use request.

Also, in the case of the present embodiment, the state machine 155 grants the ownership for N bus cycles to the bus master selected by the priority decoder 142 in accordance with the following equation (called the optimal bus cycle number calculating equation in the following explanation).

$$N=((P+S-1)/W)-(P/W)+1$$

In the above equation, "P" is address information issued when a bus master issues a bus use request and is a byte address pointing to the first byte of data to be read or written. This address "P" is equivalent to the unified address "CADR" of FIG. 7.

"S" is the size information of data to be read or written by a bus master, and is the number of the bytes of the data. This number "S" is equivalent to the unified size signal "CSZ" of FIG. 7. As thus described, in the case of the present embodiment, a bus master designates the size of data to be read or written in terms of the number of bytes.

"W" is the number of bytes corresponding to the data bus width of the area pointed to by the address information "P". This number "W" is equivalent to the number of bytes indicated by the unified bus width signal "CBW" of FIG. 7. Namely, if the unified bus width signal "CBW" is "0", the data bus width is one byte (=8 bits); and if the unified bus width signal "CBW" is "1" the data bus width is 2 bytes 16 bits).

The address information "P" indicates the ordinal number of the byte, from which the data read or write operation starts, as counted from the zeroth byte. Thus, the number (P+S−1) indicates the ordinal number of the byte, at which the data read or write operation ends, as counted from the zeroth byte.

Since the number "W" of bytes of the data bus width of the area designated by the address information "P" indicates the number of bytes of one word of the external memory 45 to be connected, the number (P+S−1)/W indicates the ordinal number of the word, at which the data read or write operation ends, as counted from the zeroth word, and the number (P/W) indicates the ordinal number of the word, from which the data read or write operation starts, as counted from the zeroth word. In other words, the number "N" indicates the number of words to be read or written. Accordingly, as easily understood, if it is assumed that one word data is transferred in one bus cycle, the number "N" indicates the number of bus cycles required for transferring data.

Furthermore, in accordance with the present embodiment, the CPU 1 can set the number "W" of bytes of the data bus width for each of the areas (the second bus zeroth area, the second bus first area and the second bus second area as illustrated in FIG. 6) by loading a value to each of the zeroth area bus width register 160, the first area bus width register 161 and the second area bus width register 162.

The address decoder 149 judges which of the three areas (the second bus zeroth area, the second bus first area and the second bus second area) is designated by the address information "P" issued by the bus master as selected by the priority decoder 142, i.e., the unified address "CADR", and the multiplexer 151 selects the data bus width of one of the three areas in accordance with the result of judgment and outputs the data bus width as selected to the state machine 155 as the unified bus width "CBW".

The state machine 155 calculates the number "N" on the basis of the optimal bus cycle number calculating equation by the use of the number "W" of bytes of the unified bus width signal "CBW".

Accordingly, even in the case where the address space is divided into a plurality of areas having different data bus widths, the state machine 155 can grant to each bus master the bus ownership of the necessary and sufficient bus cycles corresponding to the data bus width of the area to be accessed.

Furthermore, in accordance with the present embodiment, when the sound processor 7 outputs a bus use request (a wave data bus use request signal "WABR" or an envelope data bus use request signal "EVBR") while the second bus 33 is used by a bus master other than the sound processor 7, the state machine 155 interrupts the use of the bus by the bus master and grants bus ownership to the sound processor 7 on the condition that the number of the remaining bus cycles is not smaller than a predetermined number.

Accordingly, it is possible to preferentially proceed with the urgent process of the bus master such as the sound processor 7 without delay while maintaining the advantages of successive bus cycles given to the respective bus masters. The details are as follows. While the general throughput of data transmitted by the bus can be increased by granting bus ownership to the respective bus masters for successive bus cycles, the latency from issuing a bus use request by the bus master to obtaining bus ownership tends to increase. However, in the case where there is a bus master which is responsible for processing such an urgent task that bus ownership must be granted within a predetermined time period after issuing a bus use request, the increase of the latency may cause a trouble in the operation of the system. In this situation, while not compromising the throughput, it is possible to avoid the disadvantages associated with the increased latency by accepting the interrupt for granting bus ownership to a bus master responsible for processing an, urgent task if the bus master responsible for processing the urgent task issues a bus use request and if the number of the remaining bus cycles granted to the current bus master using the bus is not smaller than a predetermined number.

As thus described, in accordance with the present embodiment, the bus use request of the sound processor 7 is given priority so that, discontinuity can be prevented from occurring in the output of the audio signal AU.

Furthermore, in accordance with the present embodiment, while the first bus arbiter 13 performs arbitration of the respective first bus use request purposes (refer to FIG. 2), the second bus arbiter 14 performs arbitration of the respective second bus use request purposes (refer to FIG. 3). Accordingly, there are the following effects.

Namely, in the case where bus masters have a plurality of bus use request purposes, if the bus arbiter performs the arbitration only of the respective bus masters, an additional circuit must be provided in the respective bus masters for performing arbitration of bus use requests issued by a plurality of bus use request purposes, resulting in a greater hardware size. In addition, depending upon the circuit configuration, a time overhead may occur from the arbitration of the bus use request purposes in the respective bus masters. However, in the case where the bus arbiter (the first bus arbiter 13, the second bus arbiter 14) performs arbitration of the respective bus use request purposes in accordance with the present embodiment, the above disadvantages shall not occur.

Furthermore, in accordance with the present embodiment, a plurality of bus masters can issue the size signals "IFSZ", "CDSZ", "PPSZ" and "DSSZ" indicative of different sizes for the respective second bus use request purposes (refer to FIG. 5). This is possible also for the respective first bus use request purposes.

As has been discussed above, since a size signal indicative of a different size can be issued for each bus use request purpose corresponding to its necessary data size, it is possible to reduce the number of ineffective data accesses, further improve the rate of operating the bus and further shorten the latency of the response to a bus use request.

Furthermore, in accordance with the present embodiment, the distribution of bus cycles among the respective bus masters can be controlled by sequentially and cyclically selecting one of multiple sets of priority level information (16 priority level registers each of which stores one of the priority level information numbers 0 to 3 of FIG. 2 for the first bus arbiter 13, and 8 priority level registers 200 to 207 each of which stores one of the priority level information numbers 0 to 3 of FIG. 3 for the second bus arbiter 14).

Still further, in accordance with the present embodiment, the period of one bus cycle for each area (the second bus zeroth area, the second bus first area or the second bus second area) can be optimized corresponding to the speed of the external memory 45 connected to the second bus 33 by loading appropriate values to the registers 170 to 172 and 180 to 182 via the CPU 1 for setting the bus cycle period, without need for modification of hardware. Also, it is expected to reduce the power consumption by dynamically changing the bus cycle period through the CPU 1 in accordance with the current operation mode.

Furthermore, since the random access cycle number and the page access cycle number can be dynamically set by the CPU 1, the number of clock cycles corresponding to one bus cycle period can be optimized in accordance with the random access speed of the external memory 45 connected to the second bus 33 and the page access speed in the page mode of the external memory 45, without need for modification of hardware.

As has been discussed above, in accordance with the present embodiment, there are provided the zeroth area random access cycle number register 170, the first area random access cycle number register 171 and the second area random access cycle number register 172, and the zeroth area page access cycle number register 180, the first area page access cycle number register 181 and the second area page access cycle number register 182, for the purpose of making it possible to dynamically set the random access cycle numbers and the page access cycle numbers for the respective areas through the CPU 1. However, these random access cycle number registers 170 to 172 and these page access cycle number registers 180 to 182 may be omitted by fixedly implementing the random access cycle numbers and the page access cycle numbers in hardware so that the hardware amount can be reduced. Still further, in accordance with the present embodiment, if the number of bus cycles granted to a bus master having bus ownership is "1", the state machine 155 uses the unified random access cycle number signal "CRCY" as the bus cycle period.

In this case, the number of bus cycles of "1" granted to a bus master means that the number N calculated on the basis of the optimal bus cycle number calculating equation is 1, and therefore, for example, it means that if the bus width indicated by the unified bus width signal "CBW" is 2 bytes, the size indicated by the unified size signal "CSZ" is 2 bytes, or that if the bus width indicated by the unified bus width signal "CBW" is 1 byte, the size indicated by the unified size signal "CSZ" is 1 byte.

On the other hand, in the case where the number of bus cycles granted to a bus master having bus ownership is "2" or more, the state machine 155 uses as the bus cycle period in the first bus cycle the unified random access cycle number signal "CRCY", and uses as the bus cycle period in the subsequent bus cycles the unified page access cycle number signal "CPCY" if the current external address "EAD" points to the same page as the external address "EAD" in the previous bus cycle and the unified random access cycle number signal "CRCY" if the current external address "EAD" points to a page different from the page pointed to by the external address "EAD" in the previous bus cycle.

In this case, the number of bus cycles of "2" or more granted to a bus master means that the number N calculated on the basis of the optimal bus cycle number calculating equation is 2 or more, and therefore, for example, it means that if the bus width indicated by the unified bus width signal "CBW" is 2 bytes, the size indicated by the unified size signal "CSZ" is 4 bytes, or that if the bus width indicated by the unified bus width signal "CBW" is 1 byte, the size indicated by the unified size signal "CSZ" is 2 byte.

As has been discussed above, in the case where the second bus 33 is connected to the external memory 45 accessible in a page mode, it is possible to optimize the number of bus cycles.

Furthermore, in accordance with the present embodiment, appropriate values can be loaded to the registers 190 to 192 by the CPU 1 in order to dynamically set the page sizes. Because of this, it is possible to set the page sizes corresponding to the external memory 45 without need for modification of hardware.

As has been discussed above, in accordance with the present embodiment, there are provided the zeroth area page size register 190, the first area page size register 191 and the second area page size register 192, for the purpose of making it possible to dynamically set the page sizes for the respective areas through the CPU 1. However, these page size registers 190 to 192 may be omitted by fixedly implementing the page sizes for the respective areas in hardware so that the hardware amount can be reduced.

Furthermore, while the address space of the second bus 33 is divided into the three areas (refer to FIG. 6) in accordance with the present embodiment, it is possible to separately set the number "W" of bytes of the data bus width, the random access cycle number, the page access cycle number, and the page size for each area by loading appropriate values respectively to the registers 160 to 162, 170 to 172, 180 to 182 and 190 to 192. Then, the address decoder 149 judges which of the three areas (the second bus zeroth area, the second bus first area and the second bus second area) is designated by the address information "P" issued by the bus master as selected by the priority decoder 142, i.e., the unified address "CADR", and the multiplexers 151 to 153 and the decoder 154 select one of the three areas in accordance with the result of judgment and outputs the unified bus width signal "CBW", the unified random access cycle number signal "CRCY", the unified page access cycle number signal "CPCY" and the unified page boundary signal "CPB" to the state machine 155.

The state machine 155 calculates the number "N" on the basis of the optimal bus cycle number calculating equation from the number "W" of bytes of the data bus width indicated by the unified bus width "CBW".

Accordingly, in the case where the address space of the external memory 45 is divided into a plurality of areas having different random access speeds, different page access speeds and different data bus widths, the second bus arbiter 14 switches the random access cycle number, the page access cycle number and the data bus width each time arbitration is performed in accordance with the settings of the area to be accessed in order to optimize the bus cycle period (i.e., the period of one bus cycle and the number of the bus cycles granted to a bus master.

The foregoing description of the embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

The invention claimed is:

1. A data processing unit comprising:
   a bus;
   a plurality of bus masters connected to said bus, each of said plurality of bus masters issuing a bus use request including a bus use request purpose and size information indicative of the size of data to be read or written, said plurality of bus masters thereby issuing a plurality of bus use requests, a bus master in said plurality of bus masters being configured to vary the bus use request purpose and vary the size information in accordance with the varied bus use request purpose; and
   a bus arbitration unit operable to perform arbitration of the plurality of bus use requests issued from said plurality of bus masters and grant bus ownership to one of said bus masters,
   said bus arbitration unit comprising:
   a priority control unit operable to select one of said bus masters from among a single or a plurality of said bus masters issuing the bus use requests on the basis of priority ranking information provided for determining the priority levels of said plurality of bus masters; and
   a bus access control unit operable to grant bus ownership to said one of the bus masters as selected by said priority control unit for using said bus for one or more bus cycles corresponding to the size information as issued by said one of the bus masters as selected by said priority control unit, wherein
   said priority control unit is configured to make the selection of said one of the bus masters once for each series of the one or more bus cycles corresponding to the size information, wherein
   the priority ranking information is used to determine the priority levels of the bus use request purposes,
   said priority control unit selects one bus use request purpose on the basis of the priority ranking information from among the bus use request purposes in association with which one or more bus masters of said bus masters are issuing bus use requests, and
   said bus access control unit grants bus ownership to said bus master having the bus use request purpose selected by said priority control unit for one or more bus cycles corresponding to the size information issued by said bus master having the selected bus use request purpose.

2. The data processing unit as claimed in claim 1 wherein the size information is indicative of the number "S" of bytes to be read or written, wherein
   when issuing the bus use request to said priority control unit, said bus master also issues address information "P" indicative of a byte address pointing to the first byte of the bytes to be read or written, and wherein
   said bus access control unit grants bus ownership to said one of the bus masters as selected by said priority control unit for "N" bus cycles which can be calculated by an equation (1), $$N=((P+S-1)/W)-(P/W)+1 \tag{1}$$

where "W" is the number of bytes corresponding to the data bus width of the area pointed to by the address information "P", and "/" stands for a dividing operator for obtaining an integer quotient after discarding a fractional residue.

3. The data processing unit as claimed in claim 2 wherein an address space of said bus is divided into a plurality of areas, wherein
   the number "W" of bytes of the data bus width can be set independently for each of the areas, and wherein
   said bus access control unit judges which of the plurality of areas is designated by the address information "P" issued by said bus master as selected by said priority control unit, and calculates the "N" on the basis of the equation (1) by the use of the number "W" of bytes of the data bus width which is set of the area pointed to by the address information "P".

4. The data processing unit as claimed in claim 2 wherein said bus access control unit includes a bus cycle period information storing unit for storing bus cycle period information indicative of the length of one bus cycle, and wherein a bus cycle period is controlled on the basis of the bus cycle period information stored in said bus cycle period information storing unit, an address space of said bus is divided into a plurality of data blocks, wherein the bus cycle period information includes first bus, cycle period information and second bus cycle period information, and wherein said bus access control unit is configured when the number of bus cycles granted to said bus master is "1", to select the first bus cycle period information when the number of bus cycles granted to said bus master is "2" or more, to select in the first, bus cycle the first bus cycle period information and select in the subsequent bus cycles the second bus cycle period information if the address information points to the same data block as the address information in the previous bus cycle and the first bus cycle period information if the address information points to the data block different from the data block pointed to by the address information in the previous bus cycle, the address space of said bus is divided into a plurality of areas, and the number "W" of bytes of the data bus width, the first bus cycle period information, the second bus cycle period information and the size of the data block can be set for each of the areas, wherein said bus access control unit judges which of the plurality of areas is designated by the address information "P" issued by said bus master as selected by said priority control unit, and calculates the "N" on the basis of the equation (1) by the use of the number "W" of bytes of the data bus width which corresponds to the area pointed to by the address information "P".

5. The data processing unit as claimed in claim 1 wherein, when a predetermined bus master (hereinafter referred to as an interrupt bus master) of said plurality of bus masters issues the bus use request while said bus master other than said interrupt bus master is using said bus, said bus access control unit interrupts the use of said bus by said bus master using said bus and grants bus ownership to said interrupt bus master on the condition that the number of the remaining bus cycles currently granted to said bus master using said bus is not smaller than a predetermined number.

6. The data processing unit as claimed in claim 1 wherein said bus masters issue the size information indicative of different sizes for different bus use request purposes.

7. The data processing unit as claimed in claim 1 wherein multiple sets of priority level information are prepared as the priority ranking information, wherein said priority control unit sequentially and cyclically selects one of the multiple sets of the priority level information for every arbitration of the bus use requests from said bus masters for granting bus ownership, and selects said bus master to which bus ownership is granted on the basis of the set of the priority level information as selected.

8. The data processing unit as claimed in claim 1 wherein said bus access control unit includes a bus cycle period information storing unit for storing bus cycle period information indicative of the length of one bus cycle, and wherein a bus cycle period is controlled on the basis of the bus cycle period information stored in said bus cycle period information storing unit.

9. The data processing unit as claimed in claim 8 wherein the bus cycle period information is fixedly provided in hardware or dynamically set by said bus master.

10. The data processing unit as claimed in claim 8 wherein an address space of said bus is divided into a plurality of data blocks, wherein the bus cycle period information includes first bus cycle period information and second bus cycle period information, and wherein said bus access control unit is configured when the number of bus cycles granted to said bus master is "1", to select the first bus cycle period information when the number of bus cycles granted to said bus master is "2" or more, to select in the first bus cycle the first bus cycle period information and select in the subsequent bus cycles the second bus cycle period information if the address information points to the same data block as the address information in the previous bus cycle and the first bus cycle period information if the address information points to the data block different from the data block pointed to by the address information in the previous bus cycle.

11. The data processing unit as claimed in claim 10 wherein the size of the data block is fixedly provided in hardware or dynamically set by said bus master.

12. The data processing unit as claimed in claim 10 wherein the first bus cycle period information and the second bus cycle period information are fixedly provided in hardware or dynamically set by said bus master.

13. A bus arbitration unit configured to operate with a plurality of bus masters, each of said plurality of bus masters issuing a bus use request including a bus use request purpose and size information indicative of the size of data to be read or written, said plurality of bus masters thereby issuing a plurality of bus use requests, a bus master in said plurality of bus masters being configured to vary the bus use request purpose and vary the size information in accordance with the varied bus use request purpose, said bus arbitration unit operable to perform arbitration of the plurality of bus use requests issued from said plurality of bus masters and grant bus ownership to one of the bus masters, comprising:

a priority control unit operable to select one of the bus masters from among a single or a plurality of the bus masters issuing the bus use requests on the basis of priority ranking information provided for determining the priority levels of the plurality of bus masters; and a bus access control unit operable to grant bus ownership to the one of the bus masters as selected by said priority, control unit for using the bus for one or more bus cycles corresponding to size information which is issued by the one of the bus masters as selected by said priority control unit, wherein said priority control unit is configured to make the selection of the one of the bus masters once for each series of the one or more bus cycles corresponding to the size information, and wherein the priority ranking information is used to determine the priority levels of the bus use request purposes, said priority control unit selects one bus use request purpose on the basis of the priority ranking information from among the bus use request purposes in association with which one or more bus masters of said bus masters are issuing bus use requests, and said bus access control unit grants bus ownership to said bus master having the bus use request purpose selected by said priority control unit for one or more bus cycles corresponding to the size information issued by said bus master having the selected bus use request purpose.

14. The bus arbitration unit as claimed in claim 13 wherein the size information is indicative of the number "S" of bytes to be read or written, wherein
said bus access control unit grants bus ownership to the one of the bus masters as selected by said priority control unit for "N" bus cycles which can be calculated by an equation (2), $$N=((P+S-1)/W)-(P/W)+1 \quad (2)$$

where "P" is address information which is issued by the bus master when issuing the bus use request and is a byte address pointing to the first byte of the bytes to be read or written, "W" is the number of bytes corresponding to the data bus width of the area pointed to by the address information "P", and "/" stands for a dividing operator for obtaining an integer quotient after discarding a fractional residue.

15. The bus arbitration unit as claimed in claim 14 wherein an address space of the bus is divided into a plurality of areas, wherein
the number "W" of bytes of the data bus width can be set independently for each of the areas, and wherein
said bus access control unit judges which of the plurality of areas is designated by the address information "P" issued by the bus master as selected by said priority control unit, and calculates the "N" on the basis of the equation (2) by the use of the number "W" of bytes of the data bus width which corresponds to the area pointed to by the address information "P".

16. The bus arbitration unit as claimed in claim 14 wherein said bus access control unit includes a bus cycle period information storing unit for storing bus cycle period information indicative of the length of one bus cycle, and wherein a bus cycle period is controlled on the basis of the bus cycle period information stored in said bus cycle period information storing unit,
an address space of said bus is divided into a plurality of data blocks, wherein
the bus cycle period information includes first bus cycle period information and second bus cycle period information, and wherein
said bus access control unit is configured
when the number of bus cycles granted to said bus master is "1", to select the first bus cycle period information
when the number of bus cycles granted to said bus master is "2" or more, to select in the first bus cycle the first bus cycle period information and select in the subsequent bus cycles the second bus cycle period information if the address information points to the same data block as the address information in the previous bus cycle and the first bus cycle period information if the address information points to the data block different from the data block pointed to by the address information in the previous bus cycle,
the address space of said bus is divided into a plurality of areas, and the number "W" of bytes of the data bus width, the first bus cycle period information, the second bus cycle period information and the size of the data block can be set for each of the areas, wherein
said bus access control unit judges which of the plurality of areas is designated by the address information "P" issued by the bus master as selected by said priority control unit, and calculates the "N" on the basis of the equation (2) by the use of the number "W" of bytes of the data bus width which corresponds to the area pointed to by the address information "P".

17. The bus arbitration unit as claimed in claim 13 wherein, when a predetermined bus master (hereinafter referred to as an interrupt bus master) of the plurality of bus masters issues a bus use request while the bus master other than the interrupt bus master is using the bus, said bus access control unit interrupts the use, of the bus by the bus master using the bus and grants bus ownership to the interrupt bus master on the condition that the number of the remaining bus cycles currently granted to the bus master using the bus is not smaller than a predetermined number.

18. The bus arbitration unit as claimed in claim 13 wherein the size information indicative of different sizes is given to said bus access control unit for different bus use request purposes.

19. The bus arbitration unit as claimed in claim 13 wherein multiple sets of priority level information are prepared as the priority ranking information, wherein
said priority control unit sequentially and cyclically selects one of the multiple sets of the priority level information for every arbitration of the bus use requests from the bus masters for granting bus ownership, and selects the bus master to which bus ownership is granted on the basis of the set of the priority level information as selected.

20. The bus arbitration unit as claimed in claim 13 wherein said bus access control unit includes a bus cycle period information storing unit for storing bus cycle period information indicative of the length of one bus cycle, and wherein a bus cycle period is controlled on the basis of the bus cycle period information stored in said bus cycle period information storing unit.

21. The bus arbitration unit as claimed in claim 20 wherein the bus cycle period information is fixedly provided in hardware or dynamically set by the bus master.

22. The bus arbitration unit as claimed in claim 20 wherein an address space of the bus is divided into a plurality of data blocks, wherein
the bus cycle period information includes a first bus cycle period information and a second bus cycle period information, and wherein
said bus access control unit is configured
when the number of bus cycles granted to the bus master is "1", to select the first bus cycle period information
when the number of bus cycles granted to the bus master is "2" or more, to select in the first bus cycle the first bus cycle period information and select in the subsequent bus cycles the second bus cycle period information if the address information points to the same data block as the data block pointed to by the address information in the previous bus cycle and the first bus cycle period information if the address information points to the data block different from the data block pointed to by the address information in the previous bus cycle.

23. The bus arbitration unit as claimed in claim 22 wherein the size of the data block is fixedly provided in hardware or dynamically set by the bus master.

24. The bus arbitration circuit as claimed in claim 22 wherein the first bus cycle period information and the second bus cycle period information are fixedly provided in hardware or dynamically set by the bus master.

25. A data processing unit comprising:
an address bus through which an address space can be accessed;
a data bus operable to transport data by designating an address of the address space;
a plurality of bus masters connected to said address bus and said data bus, each of said plurality of bus masters issuing a bus use request including a bus use request purpose, size information indicative of the size of data to be transferred, and address information indicative of an address of the data to be transferred, said plurality of bus masters thereby issuing a plurality of bus use requests, a bus master in said plurality of bus masters being configured to vary the bus use request purpose and vary the size information in accordance with the varied bus use request purpose;

a bus arbitration unit operable to perform arbitration of the plurality of bus use requests issued from said plurality of bus masters on the basis of priority ranking information provided for determining the priority levels of said plurality of bus masters and grant bus ownership to one of said bus masters; and a clock signal generation unit operable to supply a clock signal to said plurality of bus masters and said bus arbitration unit, wherein said bus arbitration unit sets different numbers of clock cycles of the clock signal respectively for a plurality of areas in the address space such that one bus cycle required for transferring data by designating an address of the address space consists of the number of clock cycles corresponding to the area including the address as designated, wherein said bus arbitration unit calculates the number of clock cycles on the basis of the address and size information data as output from said bus master, and grants bus ownership to said bus master for the number of clock as calculated, wherein the priority ranking information is used to determine the priority levels of the bus use request purposes, said bus arbitration unit selects one bus use request purpose on the basis of the priority ranking information from among the bus use request purposes in association with which one or more bus masters of said bus masters are issuing bus use requests, and grants bus ownership to said bus master having the selected bus use request purpose.

26. A data processing unit comprising:

an address bus through which an address space can be accessed;

a data bus operable to transfer data by designating an address of the address space;

a plurality of memory devices having different access speeds and connected to said address bus and said data bus;

a plurality of bus masters connected to said address bus and said data bus, each of said plurality of bus masters issuing a bus use request including a bus use request purpose and size information indicative of the size of data to be transferred, a bus master in said plurality of bus masters being configured to vary the bus use request purpose and vary the size information in accordance with the varied bus use request purpose;

a bus arbitration unit operable to perform arbitration of the plurality of bus use requests issued from said plurality of bus masters on the basis of priority ranking information provided for determining the priority levels of said plurality of bus masters and grant bus ownership to one of said bus masters; and a clock signal generation unit operable to supply a clock signal to said plurality of bus masters and said bus arbitration unit, wherein when accessing one of said memory devices, said bus master outputs the bus use request to said bus arbitration unit, and wherein when bus ownership is granted to said bus master for accessing one of said memory devices, said bus arbitration unit calculates the number of clock cycles as required for accessing said one of said memory devices on the basis of the access speed of said one of said memory devices and the size information included in the bus use request as output from said bus master, and grants the bus ownership to said bus master for the number of clock cycles as calculated, wherein the priority ranking information is used to determine the priority levels of the bus use request purposes, said bus arbitration unit selects one bus use request purpose on the basis of the priority ranking information from among the bus use request purposes in association with which one or more bus masters of said bus masters are issuing bus use requests, and grants bus ownership to said bus master having the selected bus use request purpose.

27. A data processing unit comprising:

a bus;

a plurality of bus masters connected to said bus; and a bus arbitration unit operable to perform arbitration of a plurality of bus use requests issued from said plurality of bus masters and grant bus ownership to one of said bus masters, wherein when issuing the bus use request to said bus arbitration unit, said bus master also issues size information indicative of the size of data to be read or written, and wherein said bus arbitration unit comprising:

a priority control unit operable to select one of said bus masters from among a single or a plurality of said bus masters issuing the bus use requests on the basis of priority ranking information provided for determining the priority levels of said plurality of bus masters; and a bus access control unit operable to grant bus ownership to said one of the bus masters as selected by said priority control unit for using said bus for one or more bus cycles corresponding to the size information as issued by said one of the bus masters as selected by said priority control unit, wherein said priority control unit is configured to make the selection of said one of the bus masters once for each series of the one or more bus cycles corresponding to the size information, wherein the size information is indicative of the number "S" of bytes to be read or written, wherein when issuing the bus use request to said priority control unit, said bus master also issues address information "P" indicative of a byte address pointing to the first byte of the bytes to be read or written, and wherein said bus access control unit grants bus ownership to said one of the bus masters as selected by said priority control unit for "N" bus cycles which can be calculated by an equation (1), $$N=((P+S-1)/W)-(P/W)+1 \qquad (1)$$

where "W" is the number of bytes corresponding to the data bus width of the area pointed to by the address information "P", and "/" stands for a dividing operator for obtaining an integer quotient after discarding a fractional residue.

28. The data processing unit as claimed in claim 27 wherein an address space of said bus is divided into a plurality of areas, wherein the number "W" of bytes of the data bus width can be set independently for each of the areas, and wherein said bus access control unit judges which of the plurality of areas is designated by the address information "P" issued by said bus master as selected by said priority control unit, and calculates the "N" on the basis of the equation (1) by the use of the number "W" of bytes of the data bus width which is set of the area pointed to by the address information "P".

29. The data processing unit as claimed in claim 27 wherein said bus access control unit includes a bus cycle period information storing unit for storing bus cycle period information indicative of the length of one bus cycle, and wherein a bus cycle period is controlled on the basis of the bus cycle period information stored in said bus cycle period information storing unit, an address space of said bus is divided into a plurality of data blocks, wherein
the bus cycle period information includes first bus, cycle period information and second bus cycle period information, and wherein
said bus access control unit is configured
when the number of bus cycles granted to said bus master is "1", to select the first bus cycle period information
when the number of bus cycles granted to said bus master is "2" or more, to select in the first, bus cycle the first bus cycle period information and select in the subsequent bus cycles the second bus cycle period information if the address information points to the same data block as the address information in the previous bus cycle and the first bus cycle period information if the address information points to the data block different from the data block pointed to by the address information in the previous bus cycle,
the address space of said bus is divided into a plurality of areas, and the number "W" of bytes of the data bus width, the first bus cycle period information, the second bus cycle period information and the size of the data block can be set for each of the areas, wherein
said bus access control unit judges which of the plurality of areas is designated by the address information "P" issued by said bus master as selected by said priority control unit, and calculates the "N" on the basis of the equation (1) by the use of the number "W" of bytes of the data bus width which corresponds to the area pointed to by the address information "P".

30. A data processing unit comprising:
a bus;
a plurality of bus masters connected to said bus; and
a bus arbitration unit operable to perform arbitration of a plurality of bus use requests issued from said plurality of bus masters and grant bus ownership to one of said bus masters, wherein
when issuing the bus use request to said bus arbitration unit, said bus master also issues size information indicative of the size of data to be read or written, and wherein
said bus arbitration unit comprising:
a priority control unit operable to select one of said bus masters from among a single or a plurality of said bus masters issuing the bus use requests on the basis of priority ranking information provided for determining the priority levels of said plurality of bus masters; and
a bus access control unit operable to grant bus ownership to said one of the bus masters as selected by said priority control unit for using said bus for one or more bus cycles corresponding to the size information as issued by said one of the bus masters as selected by said priority control unit, wherein
said priority control unit is configured to make the selection of said one of the bus masters once for each series of the one or more bus cycles corresponding to the size information, wherein
said bus masters issue the bus use requests to said priority control unit respectively for a plurality of bus use request purposes, the number of the bus use request purposes being larger than the number of said bus masters, wherein
the priority ranking information is used to determine the priority levels of the bus use request purposes of said bus masters, wherein
said priority control unit selects one bus use request purpose on the basis of the priority ranking information from among the bus use request purposes in association with which one or more bus masters of said bus masters are issuing bus use requests, and wherein
said bus access control unit grants bus ownership to said bus master having the bus use request purpose selected by said priority control unit for one or more bus cycles corresponding to the size information issued by said bus master having the selected bus use request purpose.

31. The data processing unit as claimed in claim 30 wherein said bus masters issue the size information indicative of different sizes for different bus use request purposes.

32. A data processing unit comprising:
a bus;
a plurality of bus masters connected to said bus; and
a bus arbitration unit operable to perform arbitration of a plurality of bus use requests issued from said plurality of bus masters and grant bus ownership to one of said bus masters, wherein
when issuing the bus use request to said bus arbitration unit, said bus master also issues size information indicative of the size of data to be read or written, and wherein
said bus arbitration unit comprising:
a priority control unit operable to select one of said bus masters from among a single or a plurality of said bus masters issuing the bus use requests on the basis of priority ranking information provided for determining the priority levels of said plurality of bus masters; and
a bus access control unit operable to grant bus ownership to said one of the bus masters as selected by said priority control unit for using said bus for one or more bus cycles corresponding to the size information as issued by said one of the bus masters as selected by said priority control unit, wherein
said priority control unit is configured to make the selection of said one of the bus masters once for each series of the one or more bus cycles corresponding to the size information,
wherein said bus access control unit includes a bus cycle period information storing unit for storing bus cycle period information indicative of the length of one bus cycle, and wherein a bus cycle period is controlled on the basis of the bus cycle period information stored in said bus cycle period information storing unit,
wherein an address space of said bus is divided into a plurality of data blocks, wherein
the bus cycle period information includes first bus cycle period information and second bus cycle period information, and wherein said bus access control unit is configured
when the number of bus cycles granted to said bus master is "1", to select the first bus cycle period information
when the number of bus cycles granted to said bus master is "2" or more, to select in the first bus cycle the first bus cycle period information and select in the subsequent bus cycles the second bus cycle period information if the address information points to the same data block as the address information in the previous bus cycle and the first bus cycle period information if the address information points to the data block different from the data block pointed to by the address information in the previous bus cycle.

33. The data processing unit as claimed in claim 32 wherein the size of the data block is fixedly provided in hardware or dynamically set by said bus master.

34. The data processing unit as claimed in claim 32 wherein the first bus cycle period information and the second bus cycle period information are fixedly provided in hardware or dynamically set by said bus master.

35. A bus arbitration unit operable to perform arbitration of a plurality of bus use requests issued from a plurality of bus masters and grant bus ownership to one of the bus masters, comprising:
a priority control unit operable to select one of the bus masters from among a single or a plurality of the bus masters issuing the bus use requests on the basis of priority ranking information provided for determining the priority levels of the plurality of bus masters; and
a bus access control unit operable to grant bus ownership to the one of the bus masters as selected by said priority, control unit for using the bus for one or more bus cycles corresponding to size information which is issued by the one of the bus masters as selected by said priority control unit, wherein
said priority control unit is configured to make the selection of the one of the bus masters once for each series of the one or more bus cycles corresponding to the size information, and wherein
the size information is information indicative of the size of data to be read or written by the bus master,
wherein the size information is indicative of the number "S" of bytes to be read or written, wherein
said bus access control unit grants bus ownership to the one of the bus masters as selected by said priority control unit for "N" bus cycles which can be calculated by an equation (2), $$N=((P+S-1)/W)-(P/W)+1 \quad (2)$$

where "P" is address information which is issued by the bus master when issuing the bus use request and is a byte address pointing to the first byte of the bytes to be read or written, "W" is the number of bytes corresponding to the data bus width of the area pointed to by the address information "P", and "/" stands for a dividing operator for obtaining an integer quotient after discarding a fractional residue.

36. The bus arbitration unit as claimed in claim 35 wherein an address space of the bus is divided into a plurality of areas, wherein
the number "W" of bytes of the data bus width can be set independently for each of the areas, and wherein
said bus access control unit judges which of the plurality of areas is designated by the address information "P" issued by the bus master as selected by said priority control unit, and calculates the "N" on the basis of the equation (2) by the use of the number "W" of bytes of the data bus width which corresponds to the area pointed to by the address information "P".

37. The bus arbitration unit as claimed in claim 35 wherein said bus access control unit includes a bus cycle period information storing unit for storing bus cycle period information indicative of the length of one bus cycle, and wherein a bus cycle period is controlled on the basis of the bus cycle period information stored in said bus cycle period information storing unit,
an address space of said bus is divided into a plurality of data blocks, wherein
the bus cycle period information includes first bus cycle period information and second bus cycle period information, and wherein
said bus access control unit is configured
when the number of bus cycles granted to said bus master is "1", to select the first bus cycle period information
when the number of bus cycles granted to said bus master is "2" or more, to select in the first bus cycle the first bus cycle period information and select in the subsequent bus cycles the second bus cycle period information if the address information points to the same data block as the address information in the previous bus cycle and the first bus cycle period information if the address information points to the data block different from the data block pointed to by the address information in the previous bus cycle,
the address space of said bus is divided into a plurality of areas, and the number "W" of bytes of the data bus width, the first bus cycle period information, the second bus cycle period information and the size of the data block can be set for each of the areas, wherein
said bus access control unit judges which of the plurality of areas is designated by the address information "P" issued by the bus master as selected by said priority control unit, and calculates the "N" on the basis of the equation (2) by the use of the number "W" of bytes of the data bus width which corresponds to the area pointed to by the address information "P".

38. A bus arbitration unit operable to perform arbitration of a plurality of bus use requests issued from a plurality of bus masters and grant bus ownership to one of the bus masters, comprising:
a priority control unit operable to select one of the bus masters from among a single or a plurality of the bus masters issuing the bus use requests on the basis of priority ranking information provided for determining the priority levels of the plurality of bus masters; and
a bus access control unit operable to grant bus ownership to the one of the bus masters as selected by said priority, control unit for using the bus for one or more bus cycles corresponding to size information which is issued by the one of the bus masters as selected by said priority control unit, wherein
said priority control unit is configured to make the selection of the one of the bus masters once for each series of the one or more bus cycles corresponding to the size information, and wherein
the size information is information indicative of the size of data to be read or written by the bus master,
wherein the priority ranking information is used to determine the priority levels of bus use request purposes of the bus masters, wherein
said priority control unit selects one bus use request purpose on the basis of the priority ranking information from among the bus use request purposes in association with which one or more bus masters of said bus masters are issuing bus use requests, and wherein
said bus access control unit grants bus ownership to the bus master having the bus use request purpose selected by said priority control unit for one or more bus cycles corresponding to the size information issued by the bus master having the selected bus use request purpose.

39. The bus arbitration unit as claimed in claim 38 wherein the size information indicative of different sizes is given to said bus access control unit for different bus use request purposes.

40. A bus arbitration unit operable to perform arbitration of a plurality of bus use requests issued from a plurality of bus masters and grant bus ownership to one of the bus masters, comprising:
- a priority control unit operable to select one of the bus masters from among a single or a plurality of the bus masters issuing the bus use requests on the basis of priority ranking information provided for determining the priority levels of the plurality of bus masters; and
- a bus access control unit operable to grant bus ownership to the one of the bus masters as selected by said priority, control unit for using the bus for one or more bus cycles corresponding to size information which is issued by the one of the bus masters as selected by said priority control unit, wherein
- said priority control unit is configured to make the selection of the one of the bus masters once for each series of the one or more bus cycles corresponding to the size information, and wherein the size information is information indicative of the size of data to be read or written by the bus master,
- wherein said bus access control unit includes a bus cycle period information storing unit for storing bus cycle period information indicative of the length of one bus cycle, and wherein a bus cycle period is controlled on the basis of the bus cycle period information stored in said bus cycle period information storing unit,
- wherein an address space of the bus is divided into a plurality of data blocks,
- wherein the bus cycle period information includes a first bus cycle period information and a second bus cycle period information, and wherein
- said bus access control unit is configured
  - when the number of bus cycles granted to the bus master is "1", to select the first bus cycle period information
  - when the number of bus cycles granted to the bus master is "2" or more, to select in the first bus cycle the first bus cycle period information and select in the subsequent bus cycles the second bus cycle period information if the address information points to the same data block as the data block pointed to by the address information in the previous bus cycle and the first bus cycle period information if the address information points to the data block different from the data block pointed to by the address information in the previous bus cycle.

41. The bus arbitration unit as claimed in claim 40 wherein the size of the data block is fixedly provided in hardware or dynamically set by the bus master.

42. The bus arbitration circuit as claimed in claim 40 wherein the first bus cycle period information and the second bus cycle period information are fixedly provided in hardware or dynamically set by the bus master.

* * * * *